(12) United States Patent
Zawoad et al.

(10) Patent No.: US 11,425,148 B2
(45) Date of Patent: Aug. 23, 2022

(54) IDENTIFYING MALICIOUS NETWORK DEVICES

(71) Applicant: Visa International Service Association, San Francisco, CA (US)

(72) Inventors: D. M. Shams Zawoad, Foster City, CA (US); Philip Desch, Ashburn, VA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 274 days.

(21) Appl. No.: 16/477,453

(22) PCT Filed: Mar. 10, 2017

(86) PCT No.: PCT/US2017/021961
§ 371 (c)(1),
(2) Date: Jul. 11, 2019

(87) PCT Pub. No.: WO2018/164701
PCT Pub. Date: Sep. 13, 2018

(65) Prior Publication Data
US 2019/0387005 A1 Dec. 19, 2019

(51) Int. Cl.
*H04L 9/40* (2022.01)
*H04L 61/4511* (2022.01)
*G06N 20/20* (2019.01)

(52) U.S. Cl.
CPC ......... *H04L 63/1408* (2013.01); *G06N 20/20* (2019.01); *H04L 61/1511* (2013.01);
(Continued)

(58) Field of Classification Search
CPC ............. H04L 63/1408; H04L 61/1511; H04L 63/101; H04L 63/0236; H04L 63/1441
See application file for complete search history.

(56) References Cited

U.S. PATENT DOCUMENTS 9,288,220 B2 * 3/2016 Raugas ................. G06N 20/00
2012/0042381 A1 2/2012 Antonakakis et al.
(Continued)

FOREIGN PATENT DOCUMENTS

CN 103634317 3/2014
CN 103685307 3/2014
(Continued)

OTHER PUBLICATIONS

EP17899386.1 , "Extended European Search Report", dated Jan. 24, 2020, 9 pages.
(Continued)

*Primary Examiner* — Minh Chau Nguyen
(74) *Attorney, Agent, or Firm* — Kilpatrick Townsend & Stockton LLP

(57) ABSTRACT

Embodiments provide for maliciousness scores to be determined for IP addresses and/or network domains. For example, a request to evaluate malicious activity with respect to an IP address/network domain may be received. Multiple, and in some cases disparate, third-party systems may provide malicious activity information associated with the IP address and/or network domain. A feature set may be extracted from the malicious activity information and statistical values may be calculated from the extracted data and added to the feature set. The features set may be provided to a machine learning model as input and a maliciousness score/classification may be returned. A remedial action may be performed in accordance with the output of the machine learning model.

20 Claims, 8 Drawing Sheets

(52) U.S. Cl.
   CPC ........ *H04L 63/0236* (2013.01); *H04L 63/101* (2013.01); *H04L 63/1441* (2013.01)

(56) References Cited

U.S. PATENT DOCUMENTS

| | | |
|---|---|---|
| 2012/0198549 A1 | 8/2012 | Antonakakis et al. |
| 2014/0075558 A1 | 3/2014 | Ward et al. |
| 2014/0096251 A1 | 4/2014 | Brad et al. |
| 2015/0128263 A1 | 5/2015 | Raugas et al. |
| 2016/0065597 A1* | 3/2016 | Nguyen .............. H04L 63/1408 726/22 |

FOREIGN PATENT DOCUMENTS

| | | |
|---|---|---|
| CN | 105024969 | 11/2015 |
| CN | 105580333 | 5/2016 |
| CN | 105956472 | 9/2016 |
| KR | 100615080 | 8/2006 |
| KR | 100877911 | 1/2009 |

OTHER PUBLICATIONS

PCT/US2017/021961, "International Search Report and Written Opinion", dated Dec. 8, 2017, 13 pages.

Application No. CN201780088260.0, Office Action, dated Jul. 29, 2021, 18 pages.

Chiba et al., "Detecting Malicious Websites By Learning IP Address Features", 2012 IEEE/IPSJ 12th International Symposium on Applications and the Internet, Sep. 20, 2012, 3 pages.

Application No. CN201780088260.0, Notice of Decision to Grant, dated Mar. 2, 2022, 6 pages.

* cited by examiner

IDENTIFYING MALICIOUS NETWORK DEVICES

CROSS REFERENCE TO RELATED APPLICATIONS

This application is the US national stage of PCT/US2017/021961, filed Mar. 10, 2017, the disclosure of which is incorporated herein by reference in its entirety.

BACKGROUND

A crucial task in cyber defense is to assess the threats posed by a particular network device (e.g., a website), such as one identified by an Internet protocol (IP) address and/or a network domain name. Communication involving a malicious website can compromise a network. However, automatically assessing the maliciousness of a website, or the severity level of potential maliciousness, is challenging due to the rapidly changing behavior of IP addresses and/or network domain names. Conventional cybersecurity systems are either too subjective or inaccurate in detecting the maliciousness of a website with a high degree of fidelity. Therefore, it is currently difficult to detect malicious and suspicious activity, or a potential of malicious or suspicious activity, of IP addresses and/or network domains involved in the communication. Accordingly, conventional cybersecurity systems present significant drawbacks with respect to detection and prevention capabilities and overall security posture.

BRIEF SUMMARY

Embodiments described here address the problem described above and other problems individually and collectively. A cybersecurity system can calculate maliciousness scores for network identifiers (e.g., an IP address, a network domain, etc.) for which a malicious activity evaluation has been requested. To calculate such scores, the cybersecurity system may request malicious activity information from a variety of third-party servers such as threat intelligence providers, DNS providers, blacklist providers, network traffic report providers, and/or one or more antivirus report providers. The cybersecurity system may utilize the received malicious activity information to extract a first set of features and calculate a second set of features. These features can be input into a machine-learning model that has been previously trained using similar features of historical malicious activity information and known security classifications. Utilizing the machine-learning model, a maliciousness score may be calculated for the network identifiers. The cybersecurity system, or another system, can perform various remedial actions (e.g., influence network traffic) in accordance with the maliciousness score.

Other embodiments are directed to systems and non-transitory computer readable media associated with methods described herein.

A better understanding of the nature and advantages of embodiments of the present invention may be gained with reference to the following detailed description and the accompanying drawings.

TERMS

Figure 1:
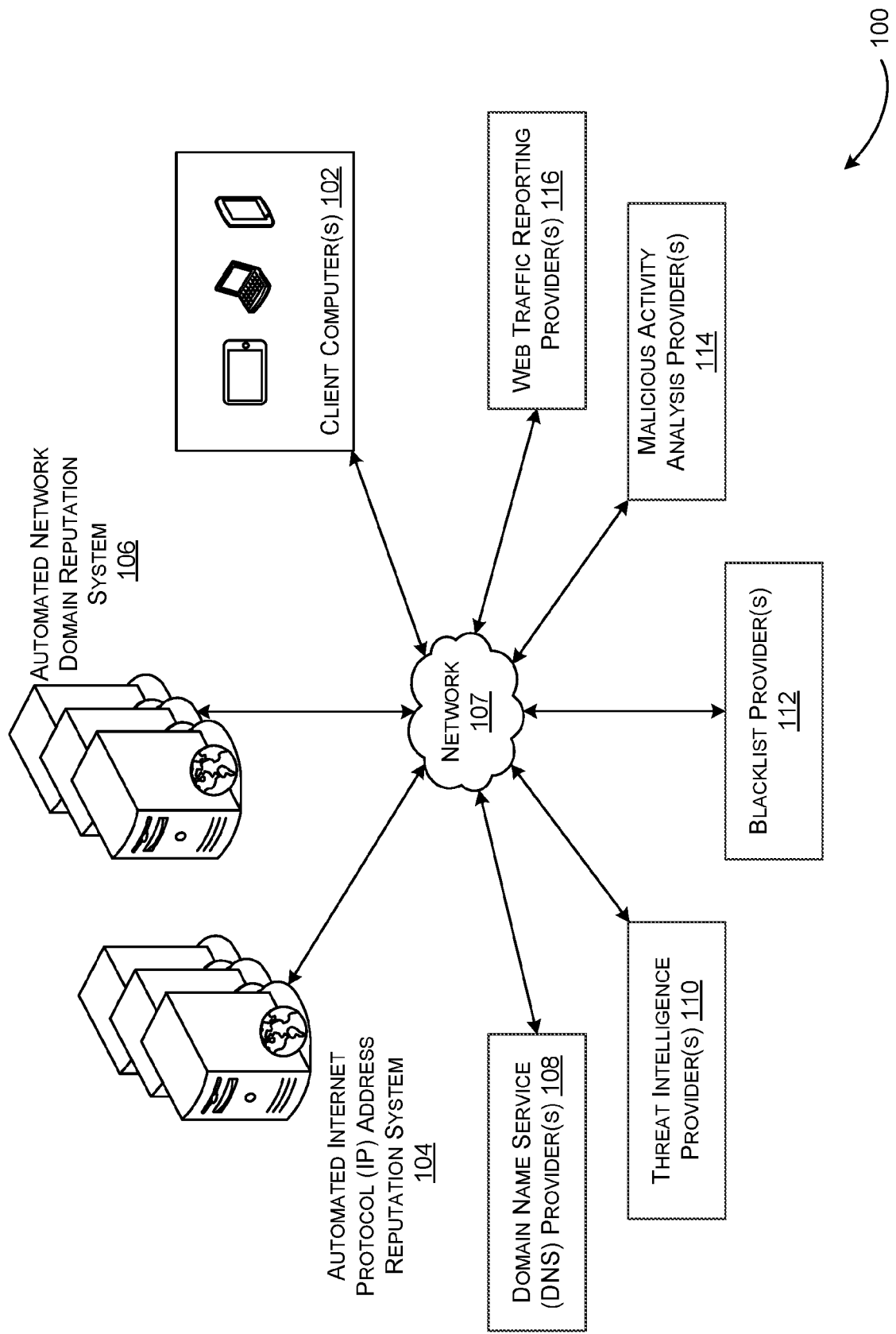
FIG. 1 is a block diagram of a system for determining a maliciousness score for a network identifier, according to some embodiments.

Prior to discussing embodiments of the invention, description of some terms may be helpful in understanding embodiments of the invention.

The term "client computer" generally refers to a computer that requests information or a service. A client computer may comprise a computer (e.g., desktop computer), a mobile device (e.g., a smart phone, laptop, or tablet computer), or a wearable device (e.g., a smart watch or activity tracker). The client computer may include wireless communication capabilities (e.g., Wi-Fi, Bluetooth, or near-field communications). In some embodiments, a client computer may communicate with a server computer. In some embodiments, a first client computer may not be capable of communicating with a server computer unless a second client computer acts as a proxy, sending and receiving messages for the first client computer.

The term "server computer" may include a powerful computer or cluster of computers. For example, the server computer can be a large mainframe, a minicomputer cluster, or a group of servers functioning as a unit. The server computer may be coupled to one or more databases and may include any hardware, software, other logic, or combination of the preceding for servicing requests from one or more client computers. The server computer may be a service provider computer that provides services (e.g., a reputation determination service) to one or more client computers. The server computer may comprise one or more computational apparatuses and may use any of a variety of computing structures, arrangements, and compilations for servicing the requests from one or more client computers.

The term "network identifier" is intended to refer to an internet protocol (IP) address or a network domain name. "Network identifiers" may refer to two or more IP addresses, two or more network domain names, or two or more identifiers that include at least one IP address and at least one network domain name. An IP address may be a unique string of numbers separated by periods that identifies a computer using the Internet Protocol to communicate over a network. A network domain name may be an identification string that defines a realm of administrative autonomy, authority or control within the Internet. Network domain names may be formed by the rules and procedures of a Domain Name System (DNS) and registered in the DNS. Network domain names may be used in various networking contexts and application-specific naming and addressing purposes. In general, a network domain name represents an Internet Protocol (IP) resource, such as a personal computer used to access the Internet, a server computer hosting a web site, or the web site itself or any other service communicated via the Internet.

The term "domain name service (DNS) provider" generally refers to a computer that is registered to join a network domain name system. In some examples, the DNS provider runs special-purpose networking software, features a public IP address, and contains a database of network domain names and IP addresses for Internet hosts. The DNS provider can be a root server that contains a complete database of Internet network domains and IP addresses, or the DNS provider may be configured to manage a subset of Internet network domain names. A DNS provider can be configured to receive requests for DNS information and to respond to such requests by transmitting DNS information (e.g., DNS resource records history) associated with one or more network domain names and/or IP addresses. DNS information may include any suitable information maintained by the DNS provider, such as IP addresses associated with a particular network domain name and network domain names that host particular IP addresses. In some embodiments, DNS information may include autonomous system information associated with one or more IP addresses, one or more threat scores for one or more network domains, a number of malicious domains hosted by a particular IP address, and the like.

The term "autonomous system" generally refers to a collection of connected IP routing prefixes under the control of one or more network operators on behalf of a single administrative entity or network domain name that presents a common routing policy to the Internet.

The term "threat intelligence provider" generally refers to threat intelligence management platform that is configured to gather, filter/analyze data, and provide threat intelligence information. In some embodiments, the threat intelligence provider can provide threat intelligence information via an electronic feed. Threat intelligence information may be customized by industry and/or by organization. Threat intelligence information can include high-risk hosts, network domain names, malicious payloads and Internet Protocol (IP) addresses, a threat classification and/or score of an IP address and/or network domain name, malware/phishing identification information, information regarding malicious files associated with an IP address and/or a network domain, indications of criminal intent, and the like.

The term "blacklist provider" generally refers to a computer that is configured to maintain and provide one or more IP-address-based and/or network-domain-name-based blacklists. A blacklist can be utilized to identify malicious sources such as email addresses, users, passwords, uniform resource locators (URLs), IP addresses, network domain names, files, hashes, from which network traffic should be restricted and/or blocked because of an association with malicious activities. In some embodiments, a blacklist may include features such as a number of hits, an attack categorization score, a history-based score, and the like, where each feature may be associated with a particular malicious source. In some embodiments, blacklist providers can include open-source blacklists and/or publically available blacklists such as Zeus Tracker, IP-Sum, Ransomware Tracker, Frodo Tracker, SSL Blacklist, Spam Filters, Bambenek, etc.

The term "malicious content analysis provider" generally refers to one or more computers that are configured to provide forensic information associated with an IP address and/or network domain name. Forensic information can include malicious files downloaded from an IP address/network domain, malicious files communicating with an IP address/network domain, and/or malicious URLs tied to an IP address/network domain name. In some examples, forensic information can include a detection ratio and/or a last-scan date. In some embodiments, a malicious content analysis provider is a virus report manager that is configured to aggregate antivirus products and/or scan engines to detect viruses and/or to verify against false positives. In some embodiments, a malicious content analysis provider may be a publically available virus detection service (e.g., VirusTotal™) that analyzes suspicious files and URLs and facilitates detection of viruses, worms, Trojans, and various kinds of malware.

The term "web traffic reporting provider" generally refers to one or more computers that are configured to analyze performance of a website with respect to other websites. In some embodiments, a web traffic-reporting provider may be configured to score and/or rank a website's performance and publically provide such scores/ranks. In some embodiments, a web traffic-reporting provider may calculate various aspects of a particular website's network traffic, such as an estimated average of daily unique visitors, an estimate number of page views over some period of time, etc. In some cases, the web traffic-reporting provider can monitor the frequency of visits and identity of visitors of a website. In some cases, the web traffic-reporting provider may assign a website a highest rank position based on determining that the website has a highest combination of unique visitors and page views with respect to other websites ranked.

The term "malicious activity information" generally refers to any suitable information provided by a DNS provider, a threat intelligence provider, a blacklist provider, a malicious content analysis provider, and/or a web traffic reporting provider. Malicious activity information can include, but is not limited to: a resource record history, a security ranking, a security category score, a domain generation algorithm (DGA) score, a threat score, a popularity score, a page rank, a geographical score, a geographical diversity score, an attack severity score, a threat type severity score, a list of malicious files associated with an IP address and/or network domain name, a number of malicious files associated with an IP address and/or network domain, a list of malicious Uniform Resource Locators (URLs) associated with an IP address and/or network domain name, blacklist data, whitelist data, a history-based score, a number and/or identity of different autonomous systems associated with an IP address, metadata associated with the different autonomous systems, a stability score related to the IP address and/or network domain, or a network traffic ranking associated with the network domain.

The term "maliciousness score" is intended to refer to a value quantifying actual and/or potential malicious activities. For example, a maliciousness score can be a numerical value that corresponds to a classification label that identifies a security risk or classification. As a non-limiting example, classification labels can include "Critical," "High," "Medium," and "Low." where "Critical" classification labels indicate a highest risk severity and "Low" classification labels indicate a lowest risk severity. In some embodiments, assignment of a classification label may depend on evidence that network identifier is associated with a maliciousness score that falls within a particular range. For example, an IP address with a maliciousness score of 10 may be assigned a "Low" classification label, while another IP address with a maliciousness score of 100 may be assigned a "High" classification label.

A "machine-learning model," may include a mathematical model that is configured to provide statistical outputs (e.g., estimates, probabilities, predictions, classifications) from a set of input variables (e.g., a feature set). In some examples, a machine-learning model may be generated and/or updated utilizing supervised machine-learning techniques. In supervised machine learning, a model is prepared through a training process where it is required to make predictions and is corrected when those predictions are incorrect or reinforced when those predictions are correct. In some embodiments, training machine-learning models may utilize conventional supervised learning algorithms, such as J48, Naive Bayes, Logistic, Decision Table, RandomTree, etc.

DETAILED DESCRIPTION

The systems and methods described herein provide comprehensive analysis for identifying malicious IP addresses and/or network domain names. A cybersecurity system may utilize malicious activity information to generate a machine-learning model to calculate a maliciousness score for an IP address and/or network domain name.

One advantage of the systems and methods described herein is that malicious activity information from multiple sources, and statistical features calculated from such information, may be combined with machine learning techniques in order to score the maliciousness of an IP address and/or network domain name with a higher degree of fidelity than was previously achievable with conventional systems. Additionally, techniques provided herein for expanding the feature set by determining related IP addresses and/or network domain names can improve the accuracy of malicious activity analysis, resulting in more accurate malicious activity detection. By utilizing the cybersecurity system(s) described herein, the multi-dimensional behavior of an IP address and/or a network domain name may be considered. Accordingly, the cybersecurity systems can provide enhanced detection and prevention capabilities that can be utilized to improve the overall security posture of an entity. Further advantages are described below.

I. Cybersecurity System and Related Infrastructure

In some embodiments, the cybersecurity system can receive requests to identify malicious IP addresses and/or network domain names. The identification can involve determining maliciousness scores for such network identifiers (i.e., the IP addresses and/or network domain name). Such requests may be transmitted by client computer(s) 102 or any suitable electronic device. In some embodiments, the cybersecurity system may evaluate the maliciousness of an IP addresses and/or a network domain without receiving a specific request to do so, such as in intermittent or regular intervals, as part of a process for updating maliciousness scores.

In response to receiving a request, the cybersecurity system may determine additional network identifiers that have some relation to the network identifier for which a malicious activity evaluation/maliciousness score has been requested. The process for determining these additional IP addresses and/or network domains will be discussed further with respect to FIGS. 4A and 4B.

In response to determining additional network identifiers, the cybersecurity system may request corresponding malicious activity information from a DNS provider, a threat intelligence provider, a blacklist provider, a malicious content analysis provider, a web traffic reporting provider, or any suitable combination of the above.

The cybersecurity system may receive at least some portion of the malicious activity information requested (e.g., from the third-party servers). The cybersecurity system may extract various features from the malicious activity information. Using the extracted features, the cybersecurity system may calculate additional features (e.g., statistical values such as standard deviations, means, medians, or the like). The extracted and/or calculated features can be utilized with the machine-learning model to determine a maliciousness score for a network identifier.

The cybersecurity system may associate the network identifier with a classification label corresponding to the maliciousness score. A classification label may indicate a degree of security risk (e.g., "High," "Medium," "Low," etc.). The cybersecurity system may provide the maliciousness score to the requesting client computer(s) and/or the cybersecurity system may store the maliciousness score in a data store that is suitable to store such information.

Depending on the maliciousness score calculated, the cybersecurity system may perform, or cause another system to perform, various remedial actions to influence network traffic. For example, a network identifier having a maliciousness score that indicates low risk may be added to a whitelist to cause traffic associated with the network identifier to be immediately allowed. Similarly, should the network identifier have a maliciousness score that indicates high risk, the network identifier may be added to a blacklist to cause traffic associated with the network identifier to be immediately rejected.

FIG. 1 is a block diagram of a system 100 for determining a maliciousness score for a network identifier, according to some embodiments. The client computer(s) 102, the cybersecurity system 104, the DNS provider(s) 108, the threat intelligence provider(s) 110, the blacklist provider(s) 112, the malicious content analysis provider(s) 114, and the web traffic reporting provider(s) 116 may individually be any suitable computing device (e.g., mainframes, desktop or laptop computers, tablets, mobile devices, wearable devices, etc.). The various provider(s) 108-116 are collectively referred to herein as "third-party servers."

The various systems and/or computers depicted in FIG. 1 may be communicatively coupled by network 107. The network 107 may include any one or a combination of many different types of networks, such as cable networks, the Internet, wireless networks, cellular networks, and other private and/or public networks. It should be appreciated that the described techniques may be applied in other client/server arrangements, as well as in non-client/server arrangements (e.g., as locally stored applications, etc.).

In the system depicted in FIG. 1, each of the third-party servers may include one or more provider computers. Therefore, it is contemplated that multiple third-party servers (e.g., multiple DNS providers) can be utilized to obtain malicious activity information for one or more IP addresses and/or network domain names.

In some embodiments, the cybersecurity system 104 may be implemented as a distributed system, with various modules and functionality being provided across a set of server computers. The cybersecurity system 104 may be configured to operate as a service. For example, the cybersecurity system, operating as a service, may expose one or more application programming interfaces (APIs) to be utilized by remote systems and/or devices in order to stimulate the functionality provided by the cybersecurity system 104. The cybersecurity system 104 may process request messages in TCP/IP format, HTTP format, or any suitable message format.

II. Functionality of Cybersecurity System

The cybersecurity system may include various engines that collectively perform operations to calculate maliciousness scores for network identifiers. The engines may include a filtering engine, a parameter determination engine, and a decision engine. Depending on the maliciousness score, a classification label indicating a degree of risk (e.g., "Critical," "High," "Medium," and "Low") may be assigned to a network identifier.

Figure 2:
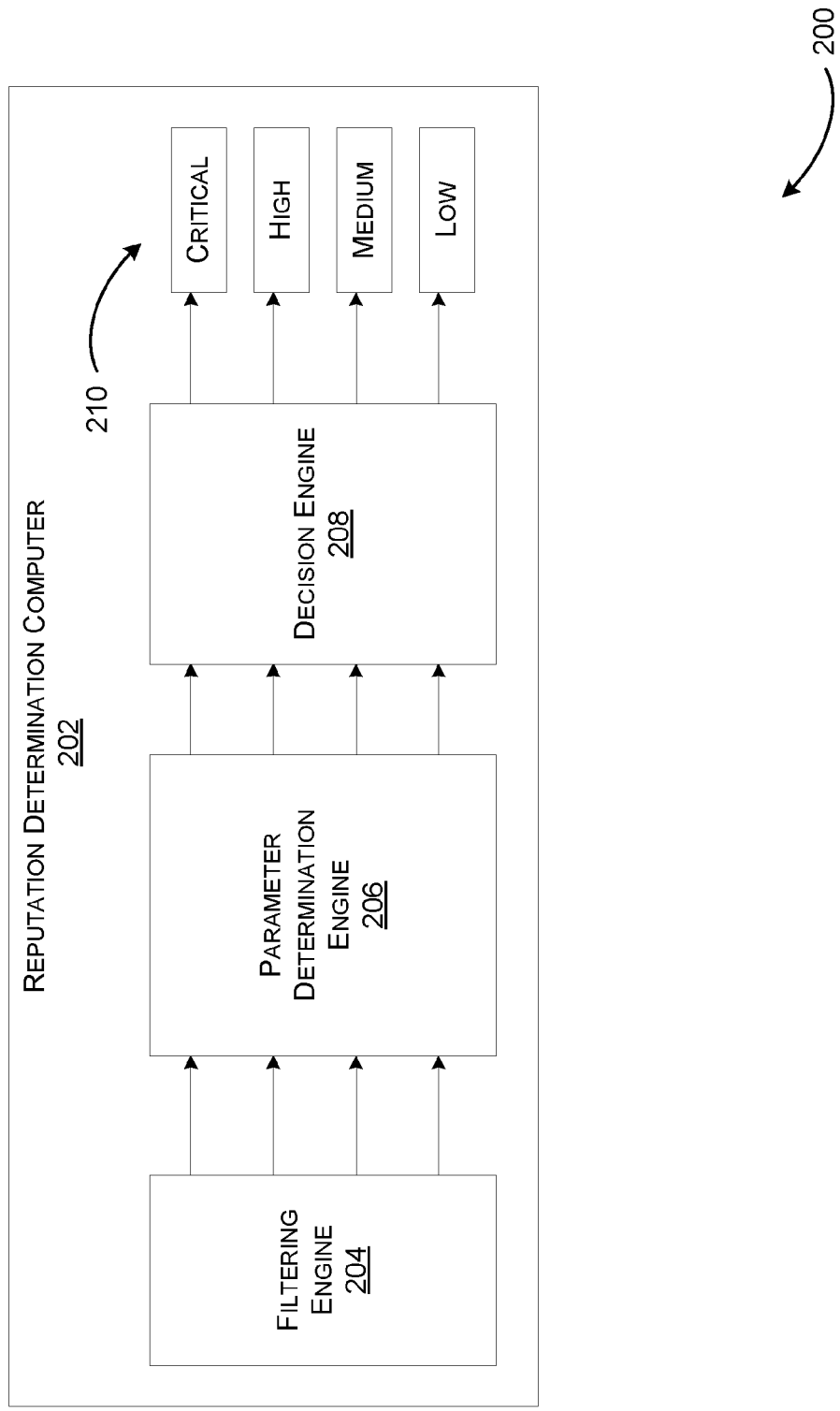
FIG. 2 is a block diagram of an exemplary cybersecurity system for determining maliciousness scores for network identifiers, according to some embodiments.

FIG. 2 is a block diagram 200 of an exemplary cybersecurity system (e.g., the cybersecurity system 104) that determines maliciousness scores for a network identifiers (e.g., IP addresses and/or network domain names), according to some embodiments. The cybersecurity system 104 may include a plurality of engines that may carry out various embodiments. These engines may be software modules, hardware modules, or a combination thereof. If the engines are software modules, the engines can be embodied on a computer readable medium and processed by a processor in any of the computer systems described herein. It should be noted that any engine, module, or data store described herein, may be a service responsible for managing data of the type required to make corresponding calculations. The engines may be exist as part of the cybersecurity system 104, or the engines may exist as separate modules or services external to the cybersecurity system 104.

In the embodiment depicted in FIG. 2, the cybersecurity system 104 may include a filtering engine 204, a parameter determination engine 206, and a decision engine 208. These engines will be discussed in more detail in the descriptions corresponding to FIGS. 3, 5, and 6.

In some embodiments, a client computer (e.g., the client computer(s) 102 of FIG. 1) can send a request message to the cybersecurity system 104 to request a maliciousness score for one or more network identifiers. In some cases, the cybersecurity system 104 may automatically evaluate malicious activity without receiving a request message. For example, as part of a process for updating a maliciousness score, the cybersecurity system 104 may evaluate the maliciousness of a network identifier according to a schedule, in response to a threshold time period elapsing since a score was last calculated, etc.

The filtering engine 204 may maintain one or more whitelists that identify network identifiers that have previously been determined to be benign and/or one or more blacklists that identify network identifiers that have previously been determined to be hostile. The filtering engine 204 may be utilized to filter out network identifiers from further processing in order to preserve processing resources of the engine(s) downstream. By way of example, the filtering engine 204 may receive a set of one or more network identifiers for which a maliciousness score is to be determined. The filtering engine 204 may compare the received network identifiers to the whitelist. If a particular network identifier is identified in a whitelist, the filtering engine 204 may ensure that the particular network identifier is not forwarded to the parameter determination engine 206 for further processing.

Network identifiers not contained in the whitelist may be forwarded to the parameter determination engine 206. The parameter determination engine 206 may collect malicious activity information from various malicious activity sources (e.g., the third-party servers of FIG. 1), extract and/or calculate various parameters (features) from the collected malicious activity information, and provide the extracted and/or calculated features to the decision engine 208.

The decision engine 208 may generate and maintain one or more machine-learning models. The decision engine 208 may utilize the features provided by the parameter determination engine 206 and one or more machine-learning models to calculate a maliciousness score for a network identifier. In some examples, the maliciousness score may correspond to a classification label (e.g., the classification labels 210). Upon determining a maliciousness score, or at another suitable time, the decision engine 208 may perform, or cause another system to perform, one or more remedial actions. Such remedial actions may include, but are not limited to, restricting/allowing network traffic, providing a notification of a condition and/or risk severity, providing one or more maliciousness scores, modifying a filter list such as a blacklist and/or whitelist, or assigning/modifying an association between an IP address/network domain name and a reputation label.

III. Architecture Cybersecurity System

Figure 3:
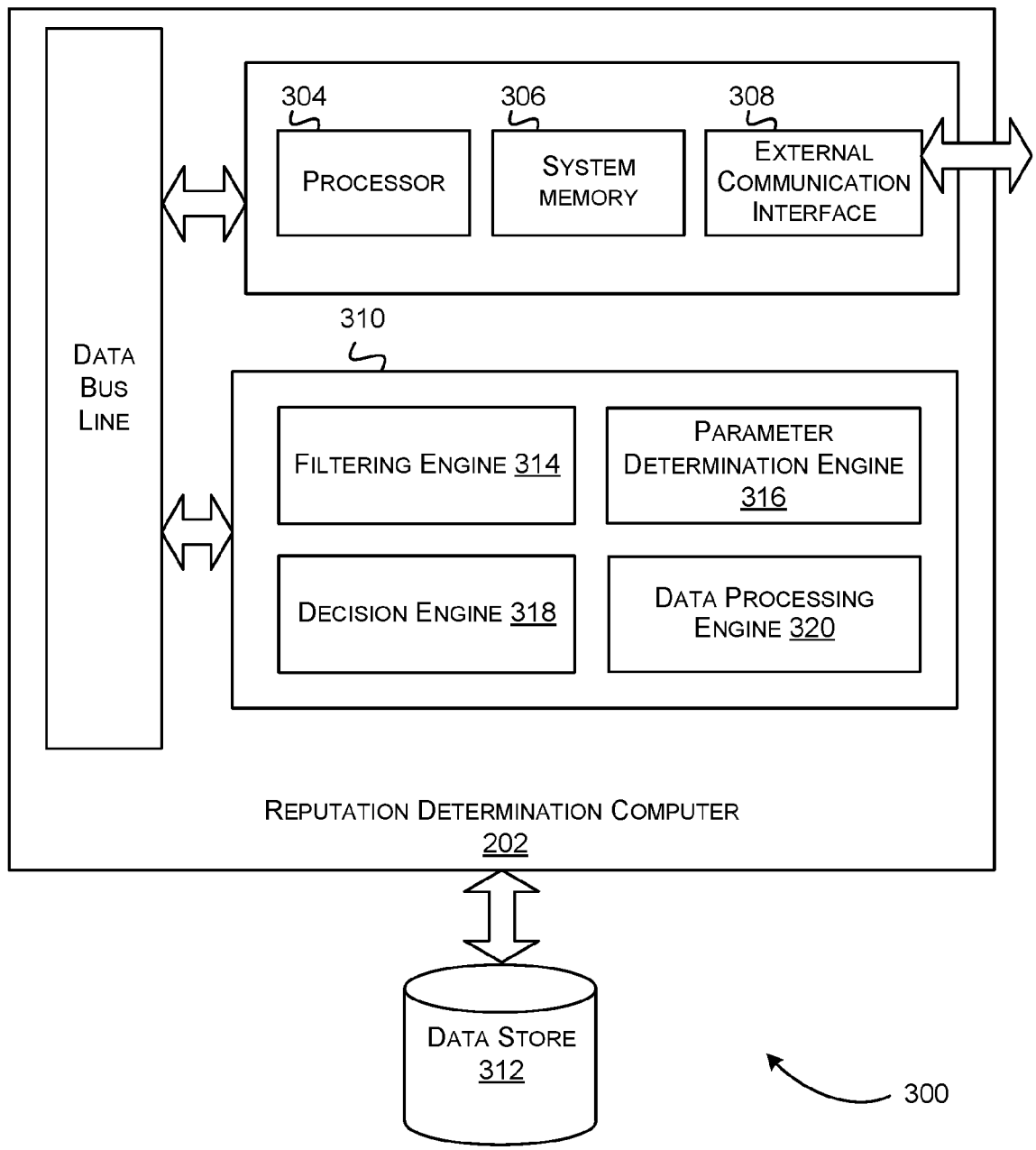
FIG. 3 is an example computer architecture capable of implementing at least some embodiments of the cybersecurity system.

FIG. 3 is an example computer architecture 300 capable of implementing at least some embodiments of the cybersecurity system 104. The cybersecurity system 104 may include a processor 304 and a computer readable medium 310 coupled to the processor 304, the computer readable medium 310 comprising code, executable by the processor 304 for performing the functionality described herein. It should be appreciated that any functionality described with respect to the engines of FIG. 3 may be combined to be performed by a single engine or may be performed by an engine that is external to the cybersecurity system 104.

FIG. 3 shows cybersecurity system 104 communicatively coupled to the data store 312. The data store 312 may be configured as depicted in FIG. 2, or the data store 312 may be provided, in whole or in part, as part of the cybersecurity system 104. The data store 312 may be a conventional, fault tolerant, relational, scalable, secure database such as Oracle™ or Sybase™. The data store 312 may be implemented using various data structures, such as an array, hash map, (linked) list, structured text file (e.g., XML), table, and/or the like. Such data structures may be stored in memory and/or in structured files. In some examples, the data store 312 may be configured to store maliciousness scores and/or reputation labels associated with one or more IP addresses and/or network domain names. Additionally, or alternatively, the data store 312 may be configured to store malicious activity information received or obtained by one or more third-party servers of FIG. 1.

The processor 304 may be coupled to a system memory 306 and an external communication interface 308. The computer readable medium 310 may also be operatively coupled to the processor 304.

The computer readable medium 310 may comprise a number of software and/or hardware engines including a filtering engine 314 (e.g., the filtering engine 204 of FIG. 2), a parameter determination engine 316 (e.g., the parameter determination engine 206 of FIG. 2), a decision engine 318 (e.g., the decision engine 208 of FIG. 2), and a request processing engine 320. More or fewer software/hardware engines may be utilized to perform the functionality described herein. The engines depicted in FIG. 3 may be included in a software application stored in the computer readable medium 310 and operating on the cybersecurity system 104.

A. Request Processing Engine

The request processing engine 320 may receive and process requests for a malicious activity evaluation. A request message may include one or more network identifiers for which a maliciousness score is requested. In some cases, rather than received a request, the request processing engine 320 may cause the processor 304 to determine one or more IP addresses and/or one or more network domains from a data store (e.g., the data store 312). By way of example, the request processing engine 320 may determine that a maliciousness score of a network identifier is to be determined based on a time since a last maliciousness score for the network identifier was assigned. Accordingly, network identifiers having maliciousness scores over a threshold age may be reevaluated for malicious activity.

In some embodiments, the request processing engine 320 may cause maliciousness scores to be recalculated intermittently, or according to a schedule maintained by the request processing engine 320. The schedule may be predetermined or the schedule may be user-defined. In some cases, the schedule may be stored in the data store 312, or another suitable storage location, and accessible to the request processing engine 320. In some embodiments, the request processing engine 320 may receive and process scheduling creation and/or modification requests (e.g., from the client computer(s) 102 of FIG. 1).

The request processing engine 320 may identify a set of network identifiers that relate to the one or more network identifiers for which a maliciousness evaluation has been initiated. To facilitate the identification of related network identifiers, the request processing engine 320 may request and/or receive passive DNS information from one or more DNS providers (e.g., the DNS provider(s) 108 of FIG. 1). "Passive DNS information" is intended to refer to DNS information that has been constructed to provide at least a partial view of the historical DNS information available in a global Domain Name System. In some examples, the request processing engine 320 can obtain passive DNS information from a centralized data store (e.g., the data store 312 or another suitable data store configured to store such information).

B. Identification of Related Network Identifiers

Figure 4A:
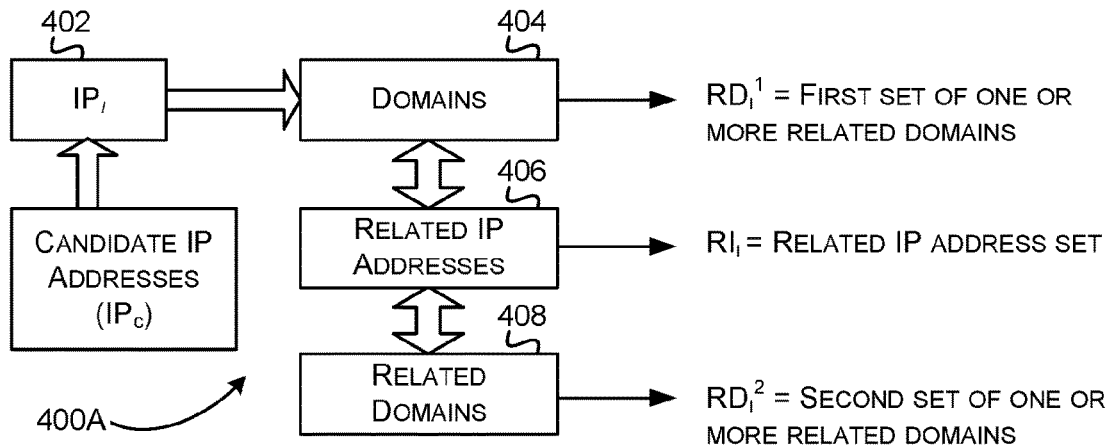
FIGS. 4A and 4B are flow diagrams illustrating an example processes for determining related network identifiers from an initial set of network identifiers, in accordance with some embodiments.
Figure 4B:
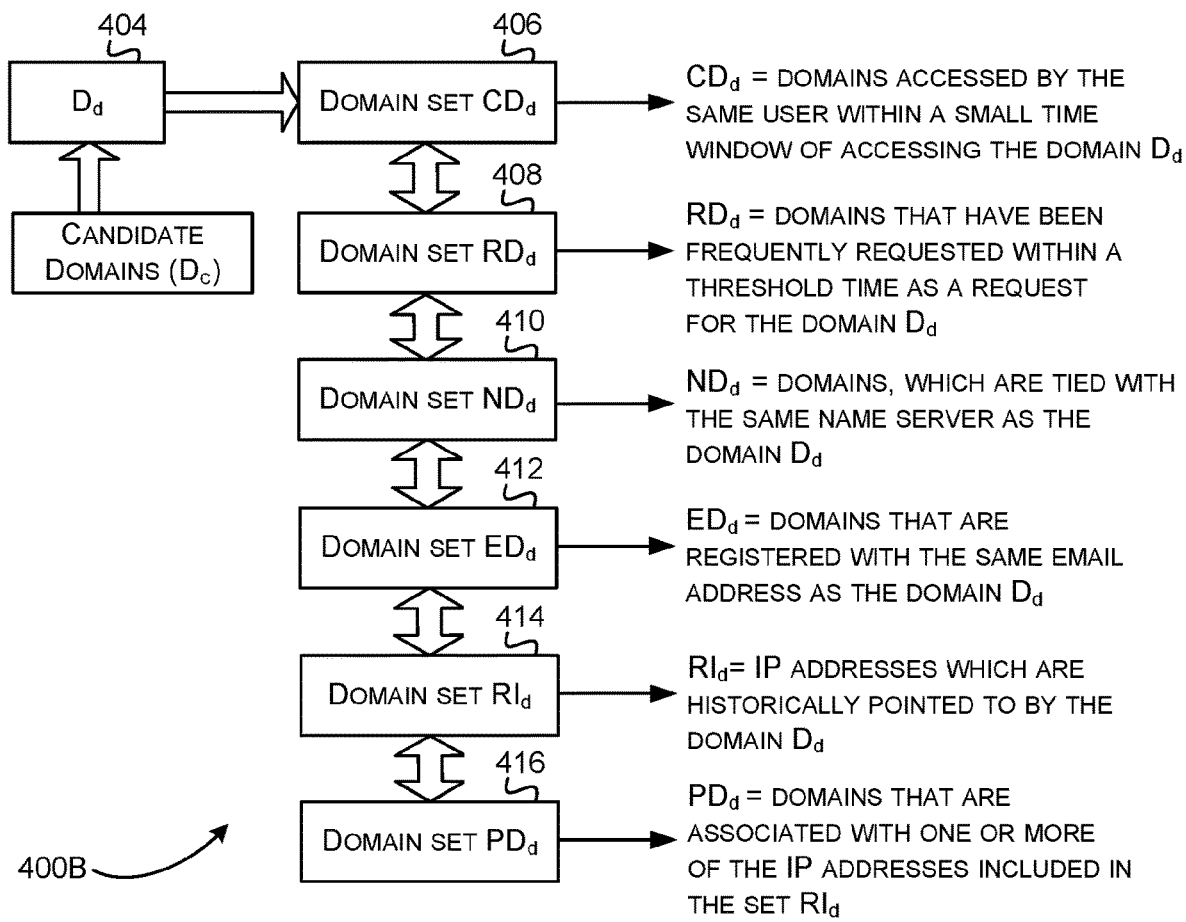

Identifying a set of related network identifiers may occur in various ways. Two examples of identifying a set of related network identifiers are provided below with respect to FIGS. 4A and 4B. Specifically, FIGS. 4A and 4B are flow diagrams 400A and 400B illustrating an example processes for determining related network identifiers from an initial set of network identifiers, in accordance with some embodiments. Specifically, the flow diagram 400A illustrates an example process for determining related IP addresses and network domains associated with an IP address ($IP_i$). The IP address $IP_i$ may be one of a set of one or more of candidate IP addresses ($IP_c$). The process described in FIG. 4A may be utilized in examples in which a maliciousness score is requested for one or more IP addresses.

At 402, the IP address, $IP_i$ (one of the candidate IP addresses of the set $IP_c$), may be received and/or obtained by the request processing engine 320 of FIG. 3 as part of the set $IP_c$. The set of one or more IP addresses $IP_c$ may be received in a request, or the set $IP_c$ may be determined by schedule or by identifying IP addresses for which a maliciousness score is over a threshold age.

At 404, given the IP address ($IP_i$), the request processing engine 320 may determine a domain set $RD_i^1$. In some examples, passive DNS information of a DNS provider may be utilized to determine a domain set $RD_i^1$ that includes one or more network domains that are associated with the IP address, $IP_i$.

At 406, the request processing engine 320 may determine a related IP address set $RI_i$ utilizing the passive DNS information. The set $RI_i$ may include one or more IP addresses that are pointed to by a network domain name of the domain set $RD_i^1$. As a non-limiting example, 195.154.209.132 may be the IP address $IP_i$. $IP_i$ currently hosts four domains. Accordingly, the set $RD_i^1$={par81-020.ff.avast.com, ipsc-par.sl.ff.avast.com, sla-par.ff.avast.com, and slw-par.ff.avast.com}. One particular domain, ipsc-par.sl.ff.avast.com, may be tied to various other IPs, which comprise the $RI_i$ set {62.210.142.144, 62.210.142.179, 62.210.142.181, 62.210.142.182, 62.210.142.183, 62.210.142.187, 62.210.142.189, 62.210.146.141, 62.210.146.154, 62.210.151.43, 62.210.152.170, 62.210.189.3}.

At 408, the request processing engine 320 may determine a second set of related domains $RD_i^2$ utilizing the passive DNS information. The set $RD_i^2$ may include one or more network domains that are individually associated with the IP addresses of the set $RI_i$. The set $RI_i$ may include one or more IP addresses, which are pointed to by a network domain name of the domain set $RD_i^2$.

The flow diagram 400B of FIG. 4B illustrates an example process for determining related IP addresses and network domains associated with a network domain name ($D_d$). The network domain $D_d$ may be one of a set of one or more of candidate network domain names ($D_c$) The process described in FIG. 4B may be utilized in examples in which a maliciousness score is requested for one or more network domain names.

At 410, the network domain, $D_d$, may be received and/or obtained by the request processing engine 320 of FIG. 3 as described above. The network domain, $D_d$, may be received and/or obtained as part of the set $D_c$. The set of one or more network domains $D_c$ may be received in a request, or the set of one or more network domains may be determined by schedule or by identifying network domains for which a maliciousness score is over a threshold age.

At 412, the request processing engine 320 may determine a related domain set $CD_d$ utilizing passive DNS information. The domain set $CD_d$ may include one or more network domains that have been accessed by a same user within a period of time before/after the user accessed the domain $D_d$.

At 414, the request processing engine 320 may cause the processor 304 to determine a related domain set $RD_d$ utilizing passive DNS information. The related domain set $RD_d$ may include one or more network domains that have been frequently (e.g., over a threshold frequency) requested around the same time (e.g., with a period of time) as the domain $D_d$, and that are not frequently (e.g., under a threshold frequency) associated with other network domains.

At 416, the request processing engine 320 may determine a domain set $ND_d$ utilizing passive DNS information. The domain set $ND_d$ may include one or more network domains that share a same name server as the domain name $D_d$.

At 418, the request processing engine 320 may determine a domain set $ED_d$ utilizing passive DNS information. The domain set $ED_d$ may include one or more network domain names that are registered with the same email address as the domain name $D_d$.

At 420, the request processing engine 320 may determine a set of one or more IP addresses, $RI_d$, utilizing passive DNS information. The set $RI_d$ may include one or more IP addresses, which are historically pointed to by individual domains of the domain name $D_d$.

At 422, the request processing engine 320 may determine a domain set $PD_d$ utilizing passive DNS information. The domain set $PD_d$ may include a set of one or more network domains that are associated with one or more of the IP addresses included in the set $RI_d$.

Upon concluding either process described in connection with FIGS. 4A and 4B, the request processing engine 320 may forward any suitable combination of the received network identifier sets (e.g., $IP_i$ and/or $D_d$) and the determined network identifier set(s) (e.g., $RI_i$, $RD_i^1$, $RD_i^2$, $CD_d$, $RD_d$, $ND_d$, $ED_d$, $RI_d$ $PD_d$) to the filtering engine 314 for further processing.

C. Filtering Engine

The filtering engine 314 may receive (e.g., from the request processing engine 320) one or more network identifiers. The received network identifiers may include any suitable number and combination of the sets received and/or determined by the request processing engine 320 in the manner described above. The filtering engine 314 may access one or more filtering lists (e.g., a whitelist, a blacklist, etc.). The filtering list may be stored in data store 312 and maintained by the request processing engine 320. Additionally, or alternatively, the filtering engine 314 may obtain a whitelist and/or blacklist from a publically available website.

The filtering engine 204 may determine whether the received network identifiers are identified in one or more whitelists. If a network identifier is identified in a whitelist or a blacklist, the filtering engine 204 may be configured to ensure that the network identifier is not forwarded to the parameter determination engine 206 for further processing. By way of example, the filtering engine 204 may remove the network identifier that is identified in the whitelist/blacklist from the set to which the network identifier belongs. Thus, the filtering engine 204 may be utilized to filter out previously determined benign or hostile network identifiers in order to preserve processing resources of the engine(s) downstream (e.g., the parameter determination engine 316, the decision engine 318, etc.).

D. Parameter Determination Engine

Figure 5:
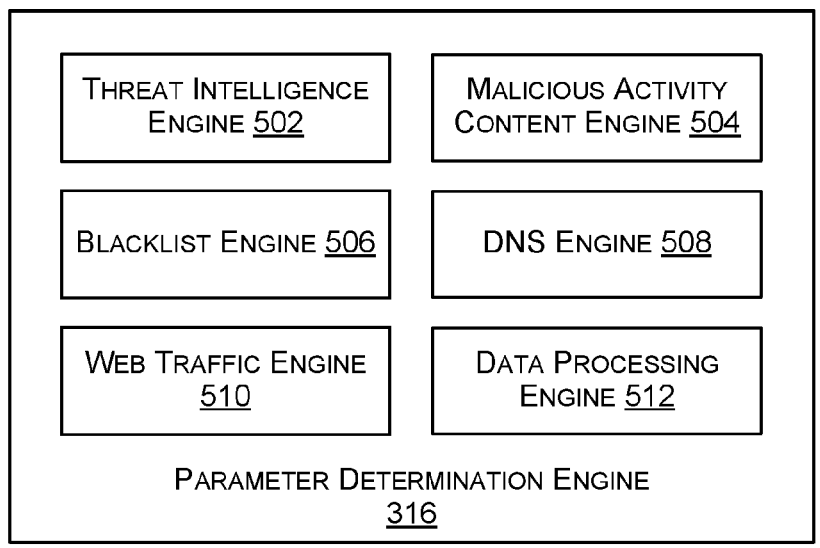
FIG. 5 is an example computer architecture of the parameter determination engine of FIG. 3 that is capable of implementing at least some aspects of the cybersecurity system, according to some embodiments.

The parameter determination engine may generally be used to extract and/or calculate features from malicious activity information. The engines provided by the parameter determination engine may individually be responsible for processing malicious activity information from a particular type of third-party server. FIG. 5 is an example computer architecture of the parameter determination engine 316 of FIG. 3 that is capable of implementing at least some aspects of the cybersecurity system 104 of FIG. 3, according to some embodiments.

The engines of the parameter determination engine 316 may be software modules, hardware modules, or a combination thereof. If the engines are software modules, the engines can be embodied on a computer readable medium and processed by a processor in any of the computer systems described herein. It should be noted that any engine, module, or data store described herein, may be a service responsible for managing data of the type required to make corresponding calculations. The engines depicted in FIG. 5 may be exist as part of the parameter determination engine 316, or the engines may exist as separate modules or services external to the parameter determination engine 316.

In the embodiment depicted in FIG. 5, the parameter determination engine 316 may include a threat intelligence engine 502, a malicious activity content engine 504, a blacklist engine 506, a DNS engine 508, a web traffic engine 510, and a data processing engine 512.

The threat intelligence engine 502 may be configured to transmit requests to one or more threat intelligence providers, such as the threat intelligence provider(s) 110 of FIG. 1, for malicious activity information associated with a one or more network identifiers. The threat intelligence engine 502 may receive malicious activity information from the threat intelligence provider(s) 110. Received malicious activity information may be stored in the data store 312, or within another suitable storage location. The stored malicious activity information may be associated with a network identifier in order to provide a mechanism for retrieving the malicious activity information after it is stored. According to some embodiments, the malicious activity information received from the threat intelligence providers may include threat scores and/or malicious files associated with a network identifier.

The malicious activity content engine 504 may transmit requests for malicious activity information to one or more malicious activity analysis providers, such as the malicious activity analysis providers(s) 114 of FIG. 1. The malicious activity content engine 504 may receive malicious activity information from the malicious activity analysis provider(s) 114. The malicious activity content engine 504 may store such malicious activity information in the data store 312, or another suitable storage location. The stored malicious activity information may be associated with a network identifier in order to provide a mechanism for retrieving the malicious activity information after it is stored. According to some embodiments, the threat intelligence engine 502 may extract forensics information (e.g., features) from the malicious activity information. Such features may include malicious files downloaded from an IP address, malicious files communicating with an IP address, and/or malicious URLs tied to an IP address.

The blacklist engine 506 may transmit requests for malicious activity information to one or more blacklist providers, such as the blacklist provider(s) 112 of FIG. 1. The blacklist engine 506 may receive malicious activity information from the blacklist provider(s) 112. The blacklist engine 506 may store such malicious activity information in the data store 312, or another suitable storage location. The stored malicious activity information may be associated with a network identifier in order to provide a mechanism for retrieving the malicious activity information after it is stored.

According to some embodiments, the blacklist engine 506 may maintain a Unified Blacklist Database (UBDB) that includes blacklist information collected from a number of obtained blacklists. By way of example, the blacklist engine 506 may access various open source blacklists, such as from Zeus Tracker, Ransomware Tracker, Frodo Tracker, SSL Blacklist, Spam Filters, and Google safe browsing. The various open source blacklists may be merged and stored in the UBDB for later consultation. The blacklist engine 506 may extract current hit and/or historic hits for an network identifier listed in the Unified Blacklist Database (UBDB).

The DNS engine 508 may transmit requests for malicious activity information to one or more DNS providers, such as the DNS provider(s) 108 of FIG. 1. The DNS engine 508 may receive malicious activity information from the DNS provider(s) 108. The DNS engine 508 may store such malicious activity information in the data store 312, or another suitable storage location. The stored malicious activity information may be associated with a network identifier in order to provide a mechanism for retrieving the malicious activity information after it is stored. According to some embodiments, the DNS engine 508 may receive DNS information from a DNS provider. DNS information received may include any suitable combination of resource record (RR) history for IPs and domains, autonomous system information associated with a multiple IP addresses, threat scores for network domain names, security scores associated with a domain, co-occurrence domain sets (e.g., the set $CD_d$ of FIG. 4B), related domain sets, malicious files associated with a domain, and number of malicious domains hosted on the IP.

The web traffic engine 510 may transmit requests for malicious activity information to one or more web traffic reporting providers, such as the web traffic reporting provider(s) 116 of FIG. 1. The web traffic engine 510 may receive such malicious activity information from the web traffic reporting provider(s) 116. The web traffic engine 510 may store malicious activity information in the data store 312, or another suitable storage location. The stored malicious activity information may be associated with a network identifier in order to provide a mechanism for retrieving the malicious activity information at a time subsequent to storage. According to some embodiments, the malicious activity information received from the web traffic reporting provider(s) 116 may include a popularity ranking or score assigned to an IP address and/or network domain name by the third-party.

The feature processing engine 512 may collect and/or access the malicious activity information received by the various third-party servers discussed above. In some examples, the feature processing engine 512 can extract suitable combinations of features (e.g., external score-based features, forensics features, blacklist-based features, behavior-based features, and network-based, discussed below) from malicious activity information provided by the third-party servers. After extracting the features from the malicious activity information, the feature processing engine 512 may compute a number of statistical features from the extracted features (e.g., summations, means, medians, etc.). The feature processing engine 512 may transmit the extracted features and computed statistical features to the decision engine 318 of FIG. 3 as part of a feature set.

In some embodiments, the feature processing engine 512 may calculate a freshness score for any of the features discussed below. A freshness score may be utilized to weigh features extracted/computed from recent malicious activity information more heavily than features extracted/computed from older malicious activity information. The features may be weighed according to a time of receipt associated with the malicious activity information. In still further examples, the features may be weighed according to a timestamp assigned by a third-party server and provided with the malicious activity information. A weight value may be determined for features of received malicious activity information based on calculating $(-\text{Log}(x^3))+6*5$, where x is the difference between the time of receipt or timestamp date of the malicious activity information and a current date in days. This weight values allows for more recent malicious activity information to have a greater impact than that of older malicious activity information.

a) Example Features

As discussed above, the feature processing engine 512 may extract or compute external-based features, forensics features, blacklist-based features, behavior-based features, and network-based from the malicious activity information received. Such features may be used to compute additional features (e.g., statistical values such as summations, means, medians, or the like, computed from the extracted features).

The extracted features and computed statistical values may be used later as input for a machine-learning model. Such features are discussed further below.

a) External-Based Features Related to an IP Address

In some embodiments, external-based featured listed below may be used to determine a maliciousness score for individual IP addresses. The external-based features may be extracted or computed by the feature processing engine 512. These external-based features may include threat scores received from the threat intelligence provider(s) 110 of FIG. 1. The threat scores may include one or more threat scores associated with each IP address of the $RI_i$, $RD_i^1$, and $RD_i^2$ sets discussed in connection with FIG. 4A. The external-based features may be weighed according to a freshness score such that more recent features effect a maliciousness score more heavily than older features.

Specific examples of external-based features extracted/computed by the feature processing engine 512 include, but are not limited to:

A threat score provided by a threat intelligence source of an IP address of the set $IP_i$.

A threat score of an IP address $IP_i$ calculated from a publicly available IP report.

At least one of a summation, mean, median, or standard deviation of at least one of the following:

One or more threat scores provided by one or more threat intelligence sources for each IP belonging to the set $RI_i$.

One or more threat scores calculated from a publicly available IP report for each IP belonging to the set $RI_i$.

One or more threat scores provided by one or more DNS providers (e.g., the DNS provider(s) 108 of FIG. 1) for each domain belonging to the set $RD_i^1$.

One or more threat scores provided by one or more DNS providers (e.g., the DNS provider(s) 108) for each domain belonging to the set $RD_i^2$.

One or more threat scores calculated from a publicly available domain report for each domain belonging to the set $RD_i^1$.

One or more threat scores calculated from a publicly available domain report for each domain belonging to the set $RD_i^2$.

One or more popularity rankings/scores (e.g., provided by the web traffic reporting provider(s) 116 of FIG. 1) for each domain belonging to the set $RD_i^1$.

One or more popularity rankings/scores (e.g., provided by the web traffic reporting provider(s) 116 of FIG. 1) for each domain belonging to the set $RD_i^2$.

b) External-Based Features Related to a Network Domain

In some embodiments, external-based featured listed below may be used to determine a maliciousness score for individual network domain name $D_d$ or the network domain name sets $CD_d$, $RD_d$, $ND_d$, $ED_d$, $PD_d$ sets described above in connection with FIG. 4B. The external-based features may be extracted or computed by the feature processing engine 512. The external-based features used to determine a maliciousness score of a network domain name may be weighed according to a freshness score such that more recent features effect a maliciousness score more heavily than older features.

Specific examples of external-based features extracted/computed by the feature processing engine 512 may include at least one of:

One or more security ranks of a network domain provided by one or more DNS service providers (e.g., the DNS provider(s) 108 of FIG. 1).

One or more threat scores of a network domain calculated from one or more publicly available domain reports.

One or more security category scores of a network domain name calculated from malicious activity information provided by one or more DNS service providers (e.g., the DNS provider(s) 108).

One or more content category scores of a network domain name calculated from malicious activity information provided by one or more DNS service providers (e.g., the DNS provider(s) 108).

One or more Domain Generation Algorithm (DGA) scores of a network domain name provided by one or more DNS service providers (e.g., the DNS provider(s) 108). The DGA scores, in some examples, may quantify a probability value indicating the likelihood that a network domain name was generated by an algorithm rather than a human.

One or more page ranks of a network domain provided by one or more DNS service providers. In some examples, a page rank may reflect the popularity of a network domain name according to Google's PageRank algorithm.

One or more popularity scores, which in some examples, may be a number of unique client IP addresses that have visited a network domain name, relative to the all requests to all network domain names. In some examples, this information may be provided by a DNS service provider.

One or more Geoscores of a network domain provided by one or more DNS service providers. In some examples, a Geoscore may represent how far apart the different physical locations serving the network domain name are with respect to one another.

One or more TLD Geo-diversity scores. In some cases, a TLD Geo-diversity score may be represented as a percentage of clients visiting the network domain name.

One or more attack severity scores of a network domain name. In some examples, an attack severity score may be calculated from the malicious activity information provided by a DNS service provider.

One or more severity scores for the threat type of a network domain name. In some examples, the severity score for a threat type may be calculated from the maliciousness activity information provided by a DNS service provider.

c) Example Forensic Features Related to an IP Address

In some embodiments, forensic features listed below may be used to determine a maliciousness score for one or more IP addresses. In some examples, the feature processing engine 512 may extract malicious URLs, malicious files, and/or malicious communicating files from malicious activity information. The related malicious URL set $U_i$ for the IP address $IP_i$ may include one or more URLs that have been historically tied with the IP address $IP_i$. The related malicious file set $MF_i$, corresponding to $IP_i$, may include a set of one or more files that are identified as possibly malicious files and that are tied with the IP address $IP_i$. The related malicious communicating file set $CF_i$ for $IP_i$, may include one or more possibly malicious files that have been communicated to/from the IP address $IP_i$. The forensic features used to determine a maliciousness score of an IP address may be weighed according to a freshness score, such that more recent features effect a maliciousness score more heavily than older features.

In some embodiments, the feature processing engine 512 may identify suspicious files and/or URLs related to an IP address $IP_i$ from the received malicious activity information. In some examples, a number of suspicious URLs, and a number of files in the $MF_i$ and $CF_i$ sets may be identified. Additionally, or alternatively, the malicious activity information may provide a list of malware tied to an IP address $IP_i$. The feature processing engine 512 may assign each of the possibly malicious URLs and files a threat score based on a last-detected date and a score provided by threat intelligence source. The last detection date may be used to measure the freshness score of the evidence. Statistical features such as a summation, a mean, a median, and a standard deviation may be calculated from the threat score for each of the sets $U_i$, $MF_i$, and $CF_i$.

In accordance with at least one embodiment, the feature processing engine 512 may extract at least one forensics feature for an IP address $IP_i$. Specific examples of forensic features extracted/computed by the feature processing engine 512 may include at least one of:

A total number of elements in the related malicious file set $MF_i$.

A total number of elements in the related communicating file set $CF_i$.

A total number of elements in the related malicious URL set $U_i$.

A percentage of malicious domains hosted by the IP address $IP_i$.

At least one of a summation, a mean, a median, or a standard deviation of at least one of the following:
  One or more threat scores for the file set $MF_i$.
  One or more threat scores for the file set $CF_i$.
  One or more threat scores for the URL set $U_i$.

d) Example Forensic Features Related to a Network Domain

In some embodiments, forensic features listed below may be used to determine a maliciousness score for one or more network domain names. The feature processing engine 512 may extract malicious URLs, malicious files, and/or malicious communicating files from malicious activity information. The related malicious URL set $U_d$ for a network domain $D_d$ may include one or more URLs that have been historically tied with the network domain $D_d$. The related malicious file set $MF_d$ corresponding to $D_d$ may include a set of one or more files that are identified as possibly malicious files and that are tied with the network domain $D_d$. The related malicious communicating file set $CF_i$ corresponding to $D_d$ may include one or more possibly malicious files that have been communicated to/from the network domain $D_d$. The feature processing engine 512 may calculate a percentage of malicious domains hosted by one or more IP addresses belonging to the set $RI_d$. The forensic features used to determine a maliciousness score of a network domain may be weighed according to a freshness score, such that more recent features effect a maliciousness score more heavily than older features.

A number of suspicious URLs, and a number of files in the $MF_i$ and $CF_i$ sets may be identified from received malicious activity information. The malicious activity information may provide a list of malware tied to the network domain $D_d$. The feature processing engine 512 may assign each of the possibly malicious URLs and/or files a threat score based on a last-detected date and a score provided by threat intelligence source. The last detection date may be used to measure the freshness score of the evidence. Statistical features such as a summation, a mean, a median, and a standard deviation may be calculated from the threat score for each of the sets $U_d$, $MF_d$, and $CF_d$.

Specific examples of forensic features extracted/computed by the feature processing engine 512 may include at least one of the following:

A total number of elements in the related malicious file set $MF_d$.

A total number of elements in the related communicating file set $CF_d$.

A total number of elements in the related malicious URL set $U_d$.

At least one of a summation, a mean, a median, and a standard deviation of at least one of the following:

One or more threat scores for one or more files of the set $MF_d$.

One or more threat scores for one or more files of the set $CF_d$.

One or more threat scores for one or more URLs of the set $U_d$.

A percentage of malicious network domains tied to an IP address of the set $RI_d$.

e) Example Blacklist-Based Features Related to an IP Address

In some embodiments, blacklist-based features listed below may be used to determine a maliciousness score for an IP address $IP_i$, described above in connection with FIG. 4A. The black-list features may be extracted or computed by the feature processing engine 512. The blacklist-based features may be weighted according to a freshness score such that more recent features effect a maliciousness score more heavily than older features. In some examples, malicious activity information may be obtained by one or more blacklist providers (e.g., the blacklist provider(s) 112 of FIG. 1). Additionally, or alternatively, malicious activity information may be obtained from a unified blacklist databased (UBDB) stored in the data store 312 of FIG. 3. The UBDB may contain malicious activity information previously obtained from one or more open source blacklists.

The feature processing engine 512 may calculate a number of hits for an IP address $IP_i$. The feature processing engine 512 may calculate an attack severity score based on the particular blacklist that identified the IP address. In some examples, a higher severity score may be assigned to an IP address that is used for command and control (C2) activity than an a severity score assigned to an IP address that has been used to send spam emails. To calculate an attack severity score, the feature processing engine 512 may utilize malicious activity information provided by one or more threat intelligence sources (e.g., the threat intelligence sources 110 of FIG. 1). In some examples, an attack severity score may be calculated from the malicious activity information received from the threat intelligence source(s) utilizing various categories of attack with which an IP address is associated. From the UBDB, a history-based score may be calculated for the IP address $IP_i$.

Specific examples of blacklist-based features extracted/computed by the feature processing engine 512 may include one or more of the following:

A total number of hits within various blacklists for the IP address $IP_i$.

An attack severity score the IP address $IP_i$.

A history-based score for the IP address $IP_i$.

At least one of a summation, a mean, a median, or a standard deviation of at least one of the following:

A hit count for all IP addresses belonging to the set $RI_i$.

One or more attack severity scores for all IP addresses belonging to the set $RI_i$.

One or more history-based scores for all IPs belonging to the set $RI_i$.

f) Example Blacklist-Based Features Related to a Network Domain

The blacklist-based features listed below may be used to determine a maliciousness score for a network domain $D_d$, described above in connection with FIG. 4B. The blacklist-based features may be extracted or computed by the feature processing engine 512. In some embodiments, the blacklist-based features may be weighted according to a freshness score such that more recent features effect a maliciousness score more heavily than older features. In some examples, malicious activity information may be obtained by one or more blacklist providers (e.g., the blacklist provider(s) 112 of FIG. 1). Additionally, or alternatively, malicious activity information may be obtained from a unified blacklist databased (UBDB) stored in the data store 312 of FIG. 3. The UBDB may contain malicious activity information previously obtained from one or more open source blacklists.

The feature processing engine 512 may calculate a number of hits for the network domain $D_d$. The feature processing engine 512 may calculate an attack severity score based on the particular blacklist that identified the network domain. In some examples, a higher severity score may be assigned to a network domain that is used for command and control (C2) activity than a severity score assigned to a network domain that has been used to send spam emails. To calculate an attack severity score, the feature processing engine 512 may utilize malicious activity information provided by one or more threat intelligence sources (e.g., the threat intelligence sources 110 of FIG. 1). In some examples, an attack severity score may be calculated from the malicious activity information received from the threat intelligence source(s) utilizing various categories of attack with which a network domain is associated. From the UBDB, a history-based score may be calculated for a network domain.

Specific examples of external-based features extracted/computed by the feature processing engine 512 may include one or more of the following:

A total number of hits within various blacklists for a network domain $D_d$.

An attack severity score of a network domain $D_d$.

A history-based score of a network domain $D_d$.

g) Example Network-Based Features Related to an IP Address

The network-based features listed below may be used to determine a maliciousness score for an IP address $IP_i$, described above in connection with FIG. 4A. Such features may be extracted or computed by the feature processing engine 512. The network-based features may be weighted according to a freshness score such that more recent features effect a maliciousness score more heavily than older features. In some examples, malicious activity information may be obtained by one or more blacklist providers (e.g., the blacklist provider(s) 112 of FIG. 1). Additionally, or alternatively, malicious activity information may be obtained from a unified blacklist database (UBDB) stored in the data store 312 of FIG. 3. The UBDB may contain malicious activity information previously obtained from one or more open source blacklists.

It should be appreciated that adversaries may often use "bullet-proof" hosting services to launch attacks in order to avoid law enforcement and other legal repercussions.

Additionally, certain autonomous systems (ASs) are known for to have a higher incidence of malicious activity than other ASs. Accordingly, in some embodiments, threats associated with an AS may be used to determine the severity level of an IP address $IP_i$. If an IP address is tied with an AS which has a history of malicious activity, that IP address may be considered to be a higher severity than other IP addresses that have no association to an AS with a history of malicious activity. To determine the threat associated with an AS, the feature processing engine 512 may calculate threat scores of one or more IP addresses of the set $IP_i$ utilizing malicious activity information provided by various threat intelligence sources and blacklist sources. The threat scores of an IP address $IP_i$ may further depend on malicious activity information provided by one or more DNS providers.

In some embodiments, the number of ASs associated with an IP directly and indirectly, the number of registration records, and the frequency of new registrations of the ASs can provide information about the life cycle of an IP address. The feature processing engine 512 may calculate the number of ASs associated with an IP address (directly or indirectly), the number of registration records, and the frequency of new registrations of the ASs. In some cases, the higher these numbers are for an IP address, the higher the possibility that the IP may be considered risky.

Specific examples of network-based features extracted/computed by the feature processing engine 512 may include one or more of the following:

- A number of different Autonomous Systems (ASs) of the set $AI_i$.
- A number of registration entries corresponding to an AS belonging to the set $AI_i$.
- An average frequency of new registrations associated with an AS belonging to the set $AI_i$.
- The number of suspicious activities associated with an AS belonging to the set $AI_i$.
- At least one of a summation, a mean, a median, or a standard deviation for at least one of the following:
  - One or more threat scores provided by an intelligence source for each IP address belonging to the set $AI_i$.
  - One or more threat scores calculated from a publicly available IP reports for one or more IP addresses belonging to the set $AI_i$.
  - One or more blacklist hit counts for one or more IP addresses belonging to the set $AI_i$.
  - One or more attack severity scores for one or more IP addresses belonging to the set $AI_i$.
  - One or more history-based scores for one or more IP addresses belonging to the set $AI_i$.

h) Example Network-Based Features Related to a Network Domain

The network-based features listed below may be used to determine a maliciousness score for a network domain $D_d$, described above in connection with FIG. 4B. The network-based features used to determine a maliciousness score of one or more network domains may be weighted according to a freshness score such that more recent features effect a maliciousness score more heavily than older features. In some examples, malicious activity information may be obtained by one or more blacklist providers (e.g., the blacklist provider(s) 112 of FIG. 1). Additionally, or alternatively, malicious activity information may be obtained from a unified blacklist databased (UBDB) stored in the data store 312 of FIG. 3. The UBDB may contain malicious activity information previously obtained from one or more open source blacklists.

As described above, adversaries may often use "bulletproof" hosting services to launch attacks in order to avoid law enforcement and other legal repercussions and certain autonomous systems (ASs) are known for to have a higher incidence of malicious activity than other ASs. Therefore, it is important to identify the risks associated with the network where a network domain is hosted. Accordingly, in some embodiments, threats associated with the $ND_d$, $ED_d$, $PD_d$, $RI_d$, and AS sets may be used to determine the severity level of a network domain. As an example, network domain names that are associated with a name server, AS, or an email address that has a history of malicious activities, may be considered to be more risky to an infrastructure than other domain names that do not have such ties. In some cases, network domains that are associated with to higher number of ASs may be considered more risky than network domains tied to fewer ASs.

To determine the threat associated with the network identifiers belonging to the sets $ND_d$, $ED_d$, $PD_d$, $RI_d$, and AS, the feature processing engine 512 may calculate threat scores of a network domain $D_d$ utilizing malicious activity information provided by various threat intelligence sources and/or blacklist sources. The threat scores of a network domain $D_d$ may further depend on malicious activity information provided by one or more DNS providers.

Specific examples of network-based features extracted/computed by the feature processing engine 512 may include one or more of the following:

- The number of different ASs belonging to the set AS.
- The number of registration entries found for one or more of the ASs belonging to the set AS.
- The average frequency of new registration of one or more of the ASs belonging to the set AS.
- The number of suspicious activities tied to an AS belonging to the set AS.
- One or more AS reputation scores provided by one or more DNS providers.
- One or more RIP scores that indicate a ranking for one or more IP addresses related to a network domain $D_d$. In some examples, the RIP scores may be provided by one or more DNS providers.
- One or more stability scores for one or more IP addresses related to a network domain $D_d$. In some examples, the stability scores may be provided by one or more DNS providers.
- One or more prefix ranks of a network domain $D_d$ given associated IP prefixes and a reputation score of these prefixes.
- The probability of a network domain $D_d$ being a fast flux candidate
- At least one of a summation, a mean, a median, or a standard deviation for at least one of the following:
  - One or more security ranks for one or more network domains of the set $ND_d$
  - One or more security ranks for one or more network domains of the set $ED_d$
  - One or more security ranks for one or more network domains of the set $PD_d$
  - One or more DGA scores for one or more network domains of the set $ND_d$
  - One or more DGA scores for one or more network domains of the set $ED_d$
  - One or more DGA scores for one or more network domains of the set $PD_d$
  - One or more attack severity scores for one or more network domains of the set $ND_d$
  - One or more attack severity scores for one or more network domains of the set $ED_d$
  - One or more attack severity scores for one or more network domains of the set $PD_d$
  - One or more threat type severity scores for one or more network domains of the set $ND_d$
  - One or more threat type severity scores for one or more network domains of the set $ED_d$ One or more threat type severity scores for one or more network domains of the set $PD_d$ One or more blacklist hit counts for one or more network domains belonging to the set $ND_d$ One or more blacklist hit counts for one or more network domains belonging to the set $ED_d$ One or more blacklist hit counts for one or more network domains belonging to the set $PD_d$ One or more threat scores provided by a threat intelligence sources for each IP address belongs to $RI_d$.

i) Example Behavior-Based Features Related to a Network Domain

The behavior-based features listed below may be used to determine a maliciousness score for a network domain $D_d$, described above in connection with FIG. 4B. The behavior-based features used to determine a maliciousness score of a network domain may be weighted according to a freshness score such that more recent features effect a maliciousness score more heavily than older features.

The feature processing engine 512 may receive malicious activity information from one or more DNS providers. The received malicious activity information may include a list of co-occurrence domains, $CD_d$, and a list of related domains, $RD_d$. As discussed above in connection with FIG. 4A, the network domains belonging to the set $RD_d$ include the network domains requested around the same time as the network domain $D_d$. Therefore, the number of malicious domains in $CD_d$ and $RD_d$ can provide valuable information about the malicious behavior of a network domain. For example, a high number of DGA domain names in the $CD_d$ and $RD_d$ sets can indicate the presence of malware. The feature processing engine 512 may calculate statistical values from the received malicious activity information.

Specific examples of behavior-based features extracted/computed by the feature processing engine 512 may include at least one of the following:

One or more security ranks for the network domains belonging to the set $CD_d$.

One or more security ranks for the network domains belonging to the set $RD_d$.

One or more DGA scores for the network domains belonging to the set $CD_d$.

One or more DGA scores for the network domains belonging to the set $RD_d$.

One or more security category scores for the network domains belonging to the set $CD_d$.

One or more security category scores for the network domains belonging to the set $RD_d$.

One or more attack severity scores for the network domains belonging to the set $CD_d$.

One or more attack severity scores for the network domains belonging to the set $RD_d$.

One or more threat type severity scores for the network domains belonging to the set $CD_d$.

One or more threat type severity scores for the network domains belonging to the set $RD_d$.

One or more blacklist hit counts for one or more network domains belonging to the set $CD_d$.

One or more black list hit counts for one or more network domains belonging to the set $RD_d$.

E. Decision Engine

Figure 6:
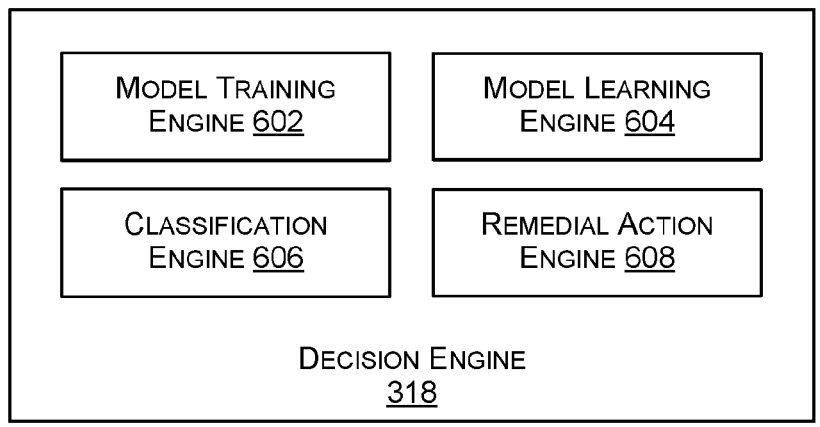
FIG. 6 is an example computer architecture of the decision engine of FIG. 3, that is capable of implementing at least some aspects of the cybersecurity system, according to some embodiments.

A decision engine may be utilized to access a machine-learning algorithm and the features provided by the parameter determination engine 316 to determine a maliciousness score for a network identifier. FIG. 6 is an example computer architecture of the decision engine 318 of FIG. 3, which is capable of implementing at least some aspects of the cybersecurity system of FIG. 3, according to some embodiments.

The decision engine 208 may include a plurality of engines that may carry out various embodiments. These engines may be software modules, hardware modules, or a combination thereof. If the engines are software modules, the engines can be embodied on a computer readable medium and processed by a processor in any of the computer systems described herein. It should be noted that any engine, module, or data store described herein, may be a service responsible for managing data of the type required to make corresponding calculations. The engines depicted in FIG. 6 may be exist as part of the decision engine 318, or the engines may exist as separate modules or services external to the decision engine 318.

In the embodiment depicted in FIG. 6, the decision engine 318 may include a model training engine 602, a scoring engine 604, and a remedial action engine 606. Such engines will be discussed in more detail below.

Model Training and Updating

The model training engine 602 may train and/or update one or more machine-learning models. The model training engine 602 may employ supervised-learning techniques to train and/or update one or more machine learning models.

The model training engine 602 may receive a feature set provided by the parameter determination engine 316 of FIG. 3. In some examples, communication between the parameter determination engine 316 and the decision engine 318 may occur through a persistent message queue for failover recovery purposes. To train the machine-learning model, the model training engine 602 may obtain training data including a list of network identifiers (e.g., one or more IP addresses and/or one or more network domain names) with an preassigned maliciousness scores. In some examples, the training data may include historical maliciousness activity information obtained from one or more malicious activity sources (e.g., the third-party servers described in connection to FIG. 1).

Using the training data, the model training engine 602 may generate and train one or more machine-learning models utilizing the features set and conventional supervised-learning algorithms, such as J48, Naive Bayes, Logistic, Decision Table, RandomTree, etc. The model training engine 602 may score each of the trained machine learning models according to its output accuracy. By way of example, the model training engine 602 may input parameters of the feature set corresponding to a single network identifier and determine a degree of accuracy of the output provided by the model. The output of the model may be compared to the preassigned maliciousness score corresponding to the network identifier. Accordingly, the model training engine 602 may score each model according to a degree of accuracy of the output of the model to the preassigned maliciousness scores provided in the training data. In some examples a highest scored model may be selected to provide maliciousness scores for network identifiers.

Multiple machine-learning models may be retrained with the updated historical malicious activity information and the model training engine 602 may select a machine learning model (e.g., the machine learning model 704 or another machine learning model) based on a degree of accuracy between the respective output of a model and the updated historical malicious activity information.

The scoring engine 604 may be configured to receive (e.g., from the parameter determination engine 316 of FIG.

3) a feature set associated with one or more network identifiers. The feature set may include any combination of the features described above in connection with the parameter determination engine 316). The scoring engine 604 may utilize the selected machine-learning model to output a maliciousness score for the network identifier corresponding to the feature set. A maliciousness score can be a numerical value. In some cases, the maliciousness score can corresponds to a classification label that identifies a security risk. As a non-limiting example, reputation labels may include "Critical," "High," "Medium," and "Low." where "Critical" reputation labels indicate a highest risk severity and "Low" reputation labels indicate a lowest risk severity. The output may be stored as historical malicious activity information to be used to update/train machine-learning algorithms.

Figure 7:
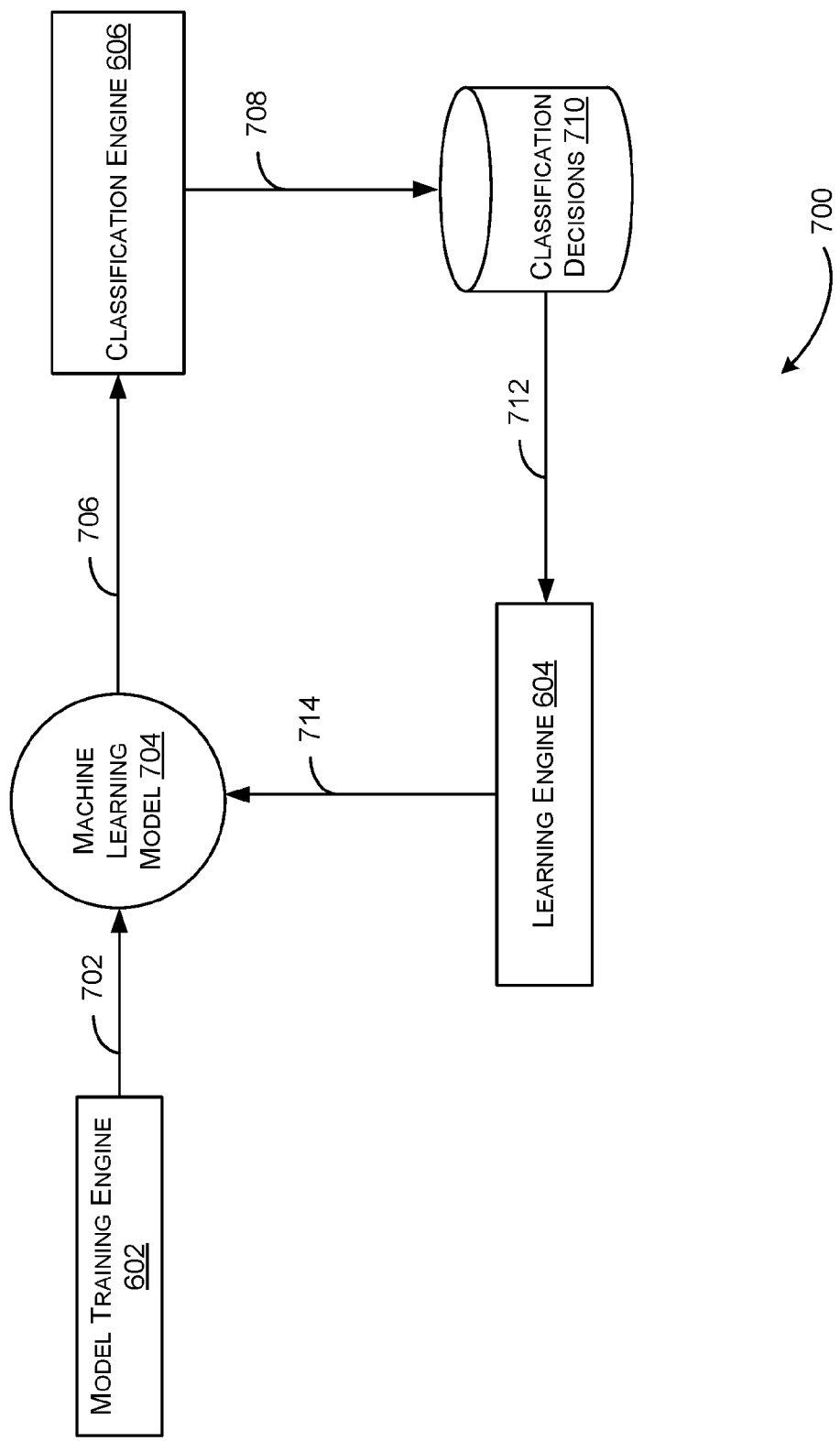
FIG. 7 is a flow diagram illustrating an example process for training and updating a machine-learning model, according to some embodiments.

FIG. 7 is a flow diagram 700 illustrating an example process for training and updating a machine-learning model, according to some embodiments. The process depicted in FIG. 7 may be performed by the model training engine 602.

At 702, the model training engine 602 may select machine-learning model 704 from a set of trained machine learning models according to a score. The score may be initially determined in the manner described above. The machine-learning model 704 may be stored in data store 312 of FIG. 3 or another location accessible to scoring engine 606 of FIG. 6.

At 706, the scoring engine 606 may access the machine learning model. Utilizing common feature types as those used to train the machine-learning model 704, the scoring engine 606 may input such features into the machine-learning model 704 to calculate a maliciousness score. By way of example, the scoring engine 606 may input the features associated with an IP address into the machine-learning model 704 and receive a maliciousness score for the IP address.

At 708, the maliciousness scores may be stored in the maliciousness scores data store 710. The maliciousness scores data store 710 may be included as part of the data store 312 of FIG. 3.

At 712, the maliciousness scores of the maliciousness scores data store 710 may be provided to the model training engine 602. The model training engine 602 may utilize the maliciousness scores (separately, or in conjunction with the historical malicious activity information) to retrain the machine-learning model 704. In some examples, the maliciousness scores may be stored as part of the historical malicious activity information for future training activities.

The process depicted in FIG. 7 may be performed any suitable number of times. Accordingly, as time progresses, the machine learning model 704 increases the efficiency and accuracy of determining maliciousness score by utilizing an ever-expanding training data set.

Freshness Considerations

The rapidly evolving nature of network identifiers over time can present challenges to an cybersecurity system such as those described herein. Additionally, network identifiers which are found to be malicious more recently potentially pose a greater security threat to an infrastructure than a network identifier that was determined to be malicious long ago. Accordingly, the machine learning models described herein may, in some embodiments, weigh features extracted and/or determined from recent malicious activity information heavier than features extracted and/or determined from older malicious activity information. In some examples, the features may be weighed according to a time of receipt associated with the malicious activity information. In still further examples, the features may be weighed according to a timestamp assigned by a third-party server and provided with the malicious activity information. A weight value may be determined for features of received malicious activity information based on calculating $(-\text{Log}(x^3))+6*5$, where x is the difference between the time of receipt or timestamp date of the malicious activity information and a current date in days. Thus, allowing more recent malicious activity information to have a greater impact than that of older malicious activity information.

Performing Remedial Actions

One function of the decision engine 318 is to perform one or more remedial actions in accordance with a determined maliciousness score. The remedial action engine 608, a module of the decision engine 318, may be configured to perform such actions. Remedial actions may include, but are not limited to, restricting/allowing network traffic, notifying a user and/or remote device of network identifier with a reputation label corresponding to a risk severity, providing one or more maliciousness scores, modifying a filter list such as a blacklist or whitelist, or assigning/modifying an association between network identifier and a reputation label or maliciousness score. It is contemplated that a single remedial action may include any suitable number and combination of the particular remedial actions listed above. In some examples, the remedial action is not necessary performed by the remedial action engine 608, but rather the remedial action engine 608 may stimulate a separate device to perform at least some portion of the remedial action(s).

As a non-limiting example, the remedial action engine 606 may receive a maliciousness score provided by the scoring engine 604. The remedial action engine 606 may consult a protocol set to determine one or more remedial actions to initiate in response to a particular maliciousness score. By way of example, the protocol set may include rules, procedures, and/or mappings that indicate a particular set of one or more remedial actions that are to be performed in response to a particular maliciousness score.

By way of example, the protocol set may indicate that network identifiers that have been associated with a "Critical" reputation label (or maliciousness score over a threshold value) should be added to a particular blacklist. As another example, the protocol set may indicate that network identifiers that have been associated with a "Low" reputation label (or maliciousness score under a threshold value) should be added to a particular whitelist. The protocol set may indicate particular entities should be notified when particular network identifiers have been associated with a "High" reputation label. The possible variations available within such a protocol set are numerous and may be contemplated by one having skill in the art of network traffic administration.

IV. Method for Determining Maliciousness Scores

A method for determining a maliciousness score for one or more network identifiers (IP addresses and/or network domains) is described below with reference to FIG. 8. This method can be implemented by the computer systems described above with respect to FIGS. 1, 2, 3, 5, and 6, for example.

Figure 8:
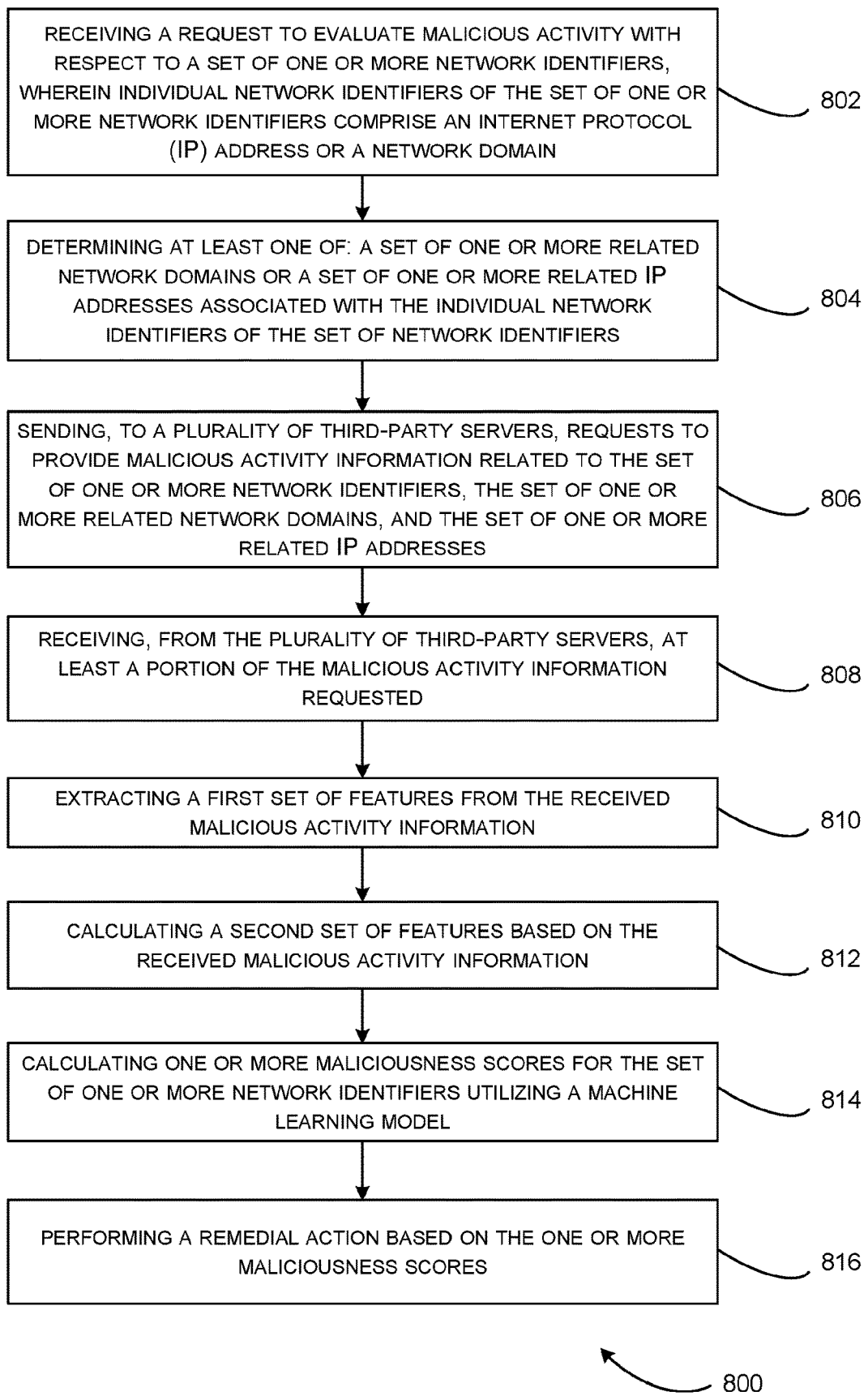
FIG. 8 shows a flow chart of an exemplary method for determining a maliciousness score for one or more network identifiers, in accordance with some embodiments.

FIG. 8 shows a flow chart of an exemplary method 800 for determining a maliciousness score for one or more network identifiers, in accordance with some embodiments. The method can be performed by a cybersecurity system (e.g., the cybersecurity system 104 of FIG. 2.

At 802, a request to evaluate malicious activity with respect to a set of one or more network identifiers may be received (e.g., by the request processing engine 320 of FIG. 3). In some examples, the request may have been initiated by the client computer(s) 102 of FIG. 1. In other embodiments, the set of one or more network identifiers may be obtained from a data store (e.g., the data store 312), rather than being received as in the method 800.

At 804, at least one of a set of one or more related network domains or a set of one or more related IP addresses associated with the individual network identifiers of the set of network identifiers may be determined (e.g., by the parameter determination engine 316 or modules of the parameter determination engine 316). If the set of network identifiers includes at least one IP address, related domains and related IP addresses may be determined for the IP address in accordance with the process described above with respect to FIG. 4A. If the set of network identifiers includes at least one network domain, then related domains and related IP addresses may be determined for the network domain in accordance with the process described above with respect to FIG. 4B. If the set of one or more network domains comprises both an IP address and a network domain, then the corresponding processes of FIGS. 4A and 4B may be performed to determine related network domains and related IP addresses.

At 806, requests to provide malicious activity information may be sent (e.g., by one or more engines of FIG. 5) to a plurality of third-party servers (e.g., the third-party servers of FIG. 1). The third-party servers may comprise any suitable combination of the DNS provider(s) 108, the threat intelligence provider(s) 110, the blacklist provider(s) 112, the malicious activity analysis provider(s) 114, and/or the web traffic reporting provider(s) 116. The requests may relate to the set of one or more network identifiers, the set of one or more related network domains, and the set of one or more related IP addresses, although any suitable combination of the above may be utilized.

At 808, at least a portion of the malicious activity information requested from the plurality of third-party servers may be received (e.g., by the corresponding engines of FIG. 5, namely the threat intelligence engine 502, the malicious activity content engine 504, the blacklist engine 506, the DNS engine 508, and the web traffic engine 510). In some embodiments, the malicious activity information may be stored by each engine of FIG. 5, or the engines of FIG. 5 may cause the malicious activity information to be stored (e.g., in data store 312). The malicious activity information received by each third-party server may be stored any suitable storage container and associated with a corresponding network identifier for later retrieval.

At 810, a first set of features may be extracted (e.g., by the feature processing engine 512 of FIG. 5) from the malicious activity information received at 808. The first set of features may include any suitable combination of the features described above in connection with the feature processing engine 512. In some embodiments, the first set of features may exclude the statistical values related to a summation, a mean, a median, and standard deviation described above.

At 812, a second set of features may be calculated (e.g., by the feature processing engine 512) from the first set of features extracted at 810. The second set of features may include any suitable statistical values (e.g., summation, mean, median, standard deviation, counts, hits, etc. such as those calculated from external-based features) described above. The second set of features may include at least one statistical value calculated from a common feature of the first set of features received from each of the plurality of third-party servers. For example, a summation may be calculated by utilizing a same feature (e.g., a threat score associated with an IP address) of one or more IP addresses, such that the feature values associated with each of the one or more IP addresses may be combined to provide the summation.

At 814, one or more maliciousness scores may be calculated (e.g., by the scoring engine 604) for the set of one or more network identifiers utilizing a machine learning model. The maliciousness scores may correspond to a reputation label (e.g., "Critical," "High," "Medium," "Low," etc.). The machine-learning model may utilize the first set of features and the second set of features as input. In some examples, the machine-learning model may be trained utilizing historical malicious activity information from one or more of the plurality of third-party servers At 816, a remedial action may be performed (e.g., by the remedial action engine 606 of FIG. 6) based on the one or more maliciousness scores calculated at 814. In some embodiments, a portion or the entire remedial action may be performed by a device that is separate from the cybersecurity system 104. Remedial actions may include, but are not limited to, restricting/allowing network traffic, notifying a user and/or remote device of a condition and/or risk severity, providing one or more maliciousness scores, modifying a filter list such as a blacklist or whitelist, or assigning/modifying an association between an IP address/network domain name and a reputation label. The remedial action performed at 816 may include any suitable number and combination of the remedial actions listed above.

V. Technical Benefits

The systems and methods provided herein can be used in a variety of security controls such as firewalls, Intrusion Detection Systems (IDSs), etc. Due to the low fidelity of conventional IP reports, malicious activity can go undetected. If undetected, Security Incidents and Events Monitoring systems (SIEMs) cannot be alerted for possibly malicious IP addresses seen in the network. Utilizing the systems and methods provided herein, multiple and disparate malicious activity information sources may be utilized to analyze malicious activity information related to one or more network identifiers. By utilizing the sources and feature sets provided herein, a risk associated with malicious activity may be more accurately determined and thus, higher fidelity alerts may be provided to other cyberdefense systems such as SIEMs and/or IDSs.

In some embodiments, the decision engine described herein runs behind a web server and supports an application programming interface (API). Accordingly, the functionality for determining a maliciousness score and/or reputation labels associated with one or more network identifiers may be provided as a service. As a result, the systems described herein can be easily integrated with conventional SIEMs and/or IDSs using the API.

The machine learning aspects provided herein, enable the automated IP address reputation system and the automated network domain system to produce higher fidelity maliciousness scores and alerts over time. Additionally, the particular features used to determine a maliciousness score provide for a more robust malicious activity analysis. Similarly, the processes of FIGS. 4A and 4B enable the automated IP address reputation system and the automated network domain system to expand the scope of a request maliciousness analysis to include related IP addresses and network domains. By analyzing the related IP addresses and related network domains in addition to the original network identifier set, the likelihood of detecting malicious activity is increased over conventional systems.

VI. Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems may be interconnected via a system bus. Additional subsystems such as a printer, a keyboard, one or more storage device(s), a monitor, which is coupled to a display adapter, and others may be utilized. Peripherals and input/output (I/O) devices, which couple to I/O controller, can be connected to the computer system by any number of means known in the art such as input/output (I/O) port (e.g., USB, FireWire). For example, I/O port or external interface (e.g. Ethernet, Wi-Fi, etc.) can be used to connect a computer system to a wide area network such as the Internet, a mouse input device, or a scanner. The interconnection via system bus may allow the central processor to communicate with each subsystem and to control the execution of instructions from system memory or storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java. C, C++, C#, Objective-C. Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors that can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A computer-implemented method, comprising performing by a cybersecurity system:
   receiving a request to evaluate malicious activity with respect to an internet protocol (IP) address and a network domain;

determining, for the IP address received in the request, a set of one or more related network domains corresponding to the IP address;
determining, for the network domain received in the request, a set of one or more related IP addresses corresponding to the network domain and a plurality of additional network domains identified using the network domain;
sending, to a plurality of third-party servers, respective requests to provide malicious activity information related to the IP address, the network domain, the set of one or more related network domains corresponding to the IP address, the set of one or more related IP addresses corresponding to the network domain, and the plurality of additional network domains identified using the network domain;
receiving, from the plurality of third-party servers, at least a portion of the malicious activity information requested;
extracting a first set of features from the malicious activity information received;
determining a second set of features based on the malicious activity information received, wherein the second set of features includes at least one statistical value calculated using two or more feature values from the first set of features;
calculating one or more maliciousness scores utilizing a machine learning model, wherein the machine learning model utilizes the first set of features and the second set of features as input, and wherein the machine learning model is trained utilizing historical malicious activity information from one or more of the plurality of third-party servers; and
performing one or more remedial actions based on the one or more maliciousness scores.

2. The computer-implemented method of claim 1, wherein the first set of features comprises data obtained directly from the maliciousness activity information, and wherein the second set of features comprises one or more statistical values corresponding to at least one of the first set of features.

3. The computer-implemented method of claim 2, wherein the one or more statistical values comprise at least one of a summation, a mean, a median, or a standard deviation.

4. The computer-implemented method of claim 1, wherein determining the set of one or more related network domains corresponding to the IP address comprises performing by the cybersecurity system:
requesting, from a domain name service (DNS) provider computer, DNS information, the DNS information identifying one or more network domains that individually host the IP address;
determining, from the DNS information, an additional set of IP addresses based on the identified one or more network domains that individually host the IP address; and
determining, from the DNS information, one or more additional domains related to the additional set of IP addresses.

5. The computer-implemented method of claim 1, wherein determining the plurality of additional network domains identified using the network domain comprises performing by the cybersecurity system:
1) identifying a co-occurrence network domain set comprising domains accessed by a same user within a time window of accessing the network domain;
2) identifying a related network domain set comprising domains that have been requested over a threshold frequency within a threshold time of a corresponding request for the network domain;
3) identifying a shared-name network domain set comprising domains that are associated with a same name server as the network domain;
4) identifying an email network domain set comprising domains that are registered with a same email address as the network domain;
5) identifying a IP address related network domain set comprising other domains that are associated with IP addresses that are associated with the network domain.

6. The computer-implemented method of claim 1, further comprising performing by the cybersecurity system:
maintaining a whitelist filter set;
comparing the IP address, the network domain, the set of one or more related network domains, and the set of one or more related IP addresses to the whitelist filter set; and
removing a particular IP address from at least one of: the IP address, the network domain, the set of one or more related network domains, or the set of one or more related IP addresses based on the comparison, wherein removing the particular IP address from a set prevents further processing of the particular IP address.

7. The computer-implemented method of claim 1, wherein the first set of features comprises a time of receipt associated with the malicious activity information, and wherein the machine learning model weighs the malicious activity information more heavily than previously-received malicious activity information based on the time of receipt.

8. The computer-implemented method of claim 1, further comprising performing by the cybersecurity system:
training the machine learning model by:
obtaining historical malicious activity information, the historical malicious activity information being associated with predetermined maliciousness scores;
extracting features from the historical malicious activity information;
calculating a plurality of statistical values based on the features extracted;
generating a plurality of machine learning models utilizing the features extracted and the plurality of statistical values;
for each of the plurality of machine learning models, calculating corresponding maliciousness scores for the historical malicious activity information; and
selecting the machine learning model from the plurality of machine learning models based on determining that a particular maliciousness score generated by the machine learning model most closely corresponds to the predetermined maliciousness scores.

9. The computer-implemented method of claim 1, further comprising performing by the cybersecurity system:
determining a reputation score associated with a particular third-party server of the plurality of third-party servers, wherein the one or more maliciousness scores are calculated further based on the reputation score.

10. The computer-implemented method of claim 1, wherein the one or more remedial actions comprise at least one of: restricting network traffic associated with the set of one or more IP addresses or providing a notification to a remote device to cause the remote device to restrict the network traffic associated with the set of one or more IP addresses.

11. A computer product, comprising:
one or more processors; and
a computer readable medium storing a plurality of instructions that, when executed, cause the one or more processors to:
receive a request to evaluate malicious activity with respect to an internet protocol (IP) address and a network domain;
determine, for the IP address received in the request, a set of one or more related network domains corresponding to the IP address;
determine, for the network domain received in the request, a set of one or more related IP addresses corresponding to the network domain and a plurality of additional network domains identified using the network domain;
send, to a plurality of third-party servers, respective requests to provide malicious activity information related to the IP address, the network domain, the set of one or more related network domains corresponding to the IP address, the set of one or more related IP addresses corresponding to the network domain, and the plurality of additional network domains identified using the network domain;
receive, from the plurality of third-party servers, at least a portion of the malicious activity information requested;
extract a first set of features from the malicious activity information received;
determine a second set of features based on the malicious activity information received, wherein the second set of features includes at least one statistical value calculated using two or more feature values from the first set of features;
calculate one or more maliciousness scores utilizing a machine learning model, wherein the machine learning model utilizes the first set of features and the second set of features as input, and wherein the machine learning model is trained utilizing historical malicious activity information from one or more of the plurality of third-party servers; and
perform one or more remedial actions based on the one or more maliciousness scores.

12. The computer product of claim 11, wherein the first set of features comprises data obtained directly from the maliciousness activity information, and wherein the second set of features comprises one or more statistical values corresponding to at least one of the first set of features.

13. The computer product of claim 12, wherein the one or more statistical values comprise at least one of a summation, a mean, a median, or a standard deviation.

14. The computer product of claim 11, wherein determining the set of one or more related network domains corresponding to the IP addresss comprises further instructions that, when executed, cause the one or more processors to:
request, from a domain name service (DNS) provider computer, DNS information, the DNS information identifying one or more network domains that individually host the IP address;
determine, from the DNS information, an additional set of IP addresses based on the identified one or more network domains that individually host the IP address; and
determine, from the DNS information, one or more additional domains related to the additional set of IP addresses.

15. The computer product of claim 11, wherein determining the plurality of additional network domains identified using the network domain comprises further instructions that, when executed, cause the one or more processors to:
1) identify a co-occurrence network domain set comprising domains accessed by a same user within a time window of accessing the network domain;
2) identify a related network domain set comprising domains that have been requested over a threshold frequency within a threshold time of a corresponding request for the network domain;
3) identify a shared-name network domain set comprising domains that are associated with a same name server as the network domain;
4) identify an email network domain set comprising domains that are registered with a same email address as the network domain;
5) identify a IP address related network domain set comprising other domains that are associated with IP addresses that are associated with the network domain.

16. The computer product of claim 11, comprising further instructions that, when executed, cause the one or more processors to:
maintain a whitelist filter set;
compare the IP address, the network domain, the set of one or more related network domains, and the set of one or more related IP addresses to the whitelist filter set; and
remove a particular IP address from at least one of: the IP address, the network domain, the set of one or more related network domains, or the set of one or more related IP addresses based on the comparison, wherein removing the particular IP address from a set prevents further processing of the particular IP address.

17. The computer product of claim 11, wherein the first set of features comprises a time of receipt associated with the malicious activity information, and wherein the machine learning model weighs the malicious activity information more heavily than previously-received malicious activity information based on the time of receipt.

18. The computer product of claim 11, further comprising additional instructions that, when executed, to cause the one or more processors to:
train the machine learning model by:
obtaining historical malicious activity information, the historical malicious activity information being associated with predetermined maliciousness scores;
extracting features from the historical malicious activity information;
calculating a plurality of statistical values based on the features extracted;
generating a plurality of machine learning models utilizing the features extracted and the plurality of statistical values;
for each of the plurality of machine learning models, calculating corresponding maliciousness scores for the historical malicious activity information; and
selecting the machine learning model from the plurality of machine learning models based on determining that a particular maliciousness score generated by the machine learning model most closely corresponds to the predetermined maliciousness scores.

19. The computer product of claim 11, further comprising additional instructions that, when executed, to cause the one or more processors to:
determine a reputation score associated with a particular third-party server of the plurality of third-party servers, wherein the one or more maliciousness scores are calculated further based on the reputation score.

20. The computer product of claim 11, wherein the one or more remedial actions comprise at least one of: restricting network traffic associated with the set of one or more IP addresses or providing a notification to a remote device to cause the remote device to restrict the network traffic associated with the set of one or more IP addresses.

* * * * *